US006655907B2

(12) United States Patent
Brock et al.

(10) Patent No.: US 6,655,907 B2
(45) Date of Patent: Dec. 2, 2003

(54) FLUID DRIVEN VACUUM ENHANCED GENERATOR

(75) Inventors: Gerald E. Brock, Livonia, NY (US); Garry P. Haltof, Penfield, NY (US); Howard J. Greenwald, Rochester, NY (US)

(73) Assignee: Future Energy Solutions Inc, Rochester, NY (US)

( * ) Notice: Subject to any disclaimer, the term of this patent is extended or adjusted under 35 U.S.C. 154(b) by 0 days.

(21) Appl. No.: 10/162,946

(22) Filed: Jun. 5, 2002

(65) Prior Publication Data

US 2003/0175109 A1 Sep. 18, 2003

Related U.S. Application Data

(63) Continuation-in-part of application No. 10/100,368, filed on Mar. 18, 2002.

(51) Int. Cl.[7] ................................................ F03B 15/06

(52) U.S. Cl. ........................................................ 415/4.2
(58) Field of Search .......................... 415/3.1, 4.2, 4.4, 415/907, 191, 211.2, 203; 416/197 A; 290/44, 55

(56) References Cited

U.S. PATENT DOCUMENTS 5,083,899 A * 1/1992 Koch ........................ 415/2.1

* cited by examiner

*Primary Examiner*—Edward K. Look
*Assistant Examiner*—Kimya N McCoy
(74) *Attorney, Agent, or Firm*—Howard J. Greenwald

(57) ABSTRACT

A fluid-driven power generator having a turbine with several vanes, an exhaust chamber, a device for directing a first fluid towards the vanes of the turbine, a device for directing a second fluid through the generator housing assembly without contacting said turbine, a device for combining the first fluid and the second fluid in an exhaust chamber, and a device for creating a vacuum in the exhaust chamber.

20 Claims, 32 Drawing Sheets

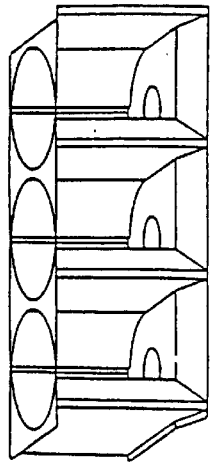
Figure 18A
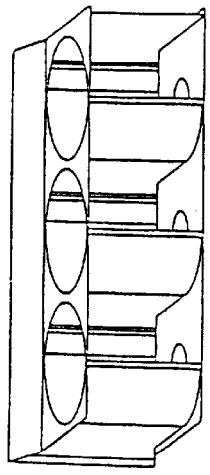
Figure 18B
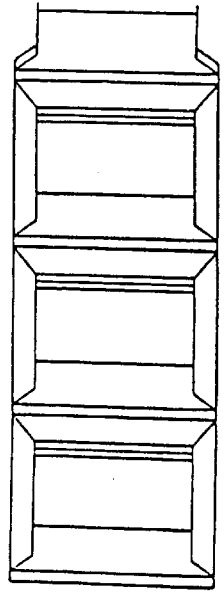
Figure 18C
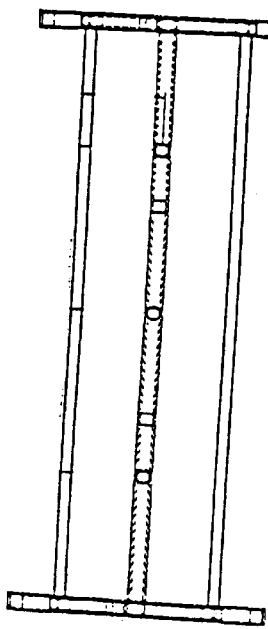
Figure 18E
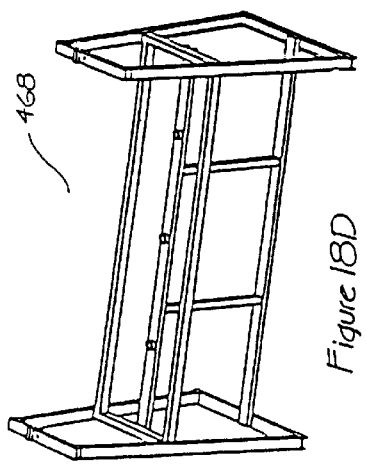
Figure 18D
Figure 18.

US 6,655,907 B2

FLUID DRIVEN VACUUM ENHANCED GENERATOR

CROSS-REFERENCE TO RELATED PATENT APPLICATION

This application is a continuation-in-part of applicants' copending patent application U.S. Ser. No. 10/100,368, filed on Mar. 18, 2002.

FIELD OF THE INVENTION

A fluid driven coaxial electrical generator that is disposed within a fluid directing, velocity amplifying cowling.

BACKGROUND OF THE INVENTION

Wind-driven power generators have been known for hundreds of years. Many of these prior art generators are large and cumbersome and, thus, cannot readily be used within small confined spaces.

It is an object of this invention to provide an efficient, compact wind-driven power generator.

It is another object of this invention to provide a more efficient power generator than is available in the prior art.

SUMMARY OF THE INVENTION

In accordance with this invention, there is provided a fluid-driven power generator comprised of a turbine disposed within a cowling, wherein the front of said cowling is comprised of means for directing fluid towards the tangential portions of said turbine, and wherein means are provided for creating a vacuum downstream of the exhaust of the generator.

BRIEF DESCRIPTION OF THE DRAWINGS

The invention will be described by reference to the following drawings, in which like numerals refer to like elements, and in which:

The invention will be described by reference to the following drawings, in which like numerals refer to like elements, and in which:

FIGS. 18A, 18B, 18C, 18D, and 18E illustrate components of a housing for a generator;

DESCRIPTION OF THE PREFERRED EMBODIMENTS

This specification is divided into two parts. In the first part of this specification, wind driven generators without auxiliary vacuum generation devices are discussed. In the second part of this specification, wind driven generators with auxiliary vacuum generation devices are discussed.

Figure 1:
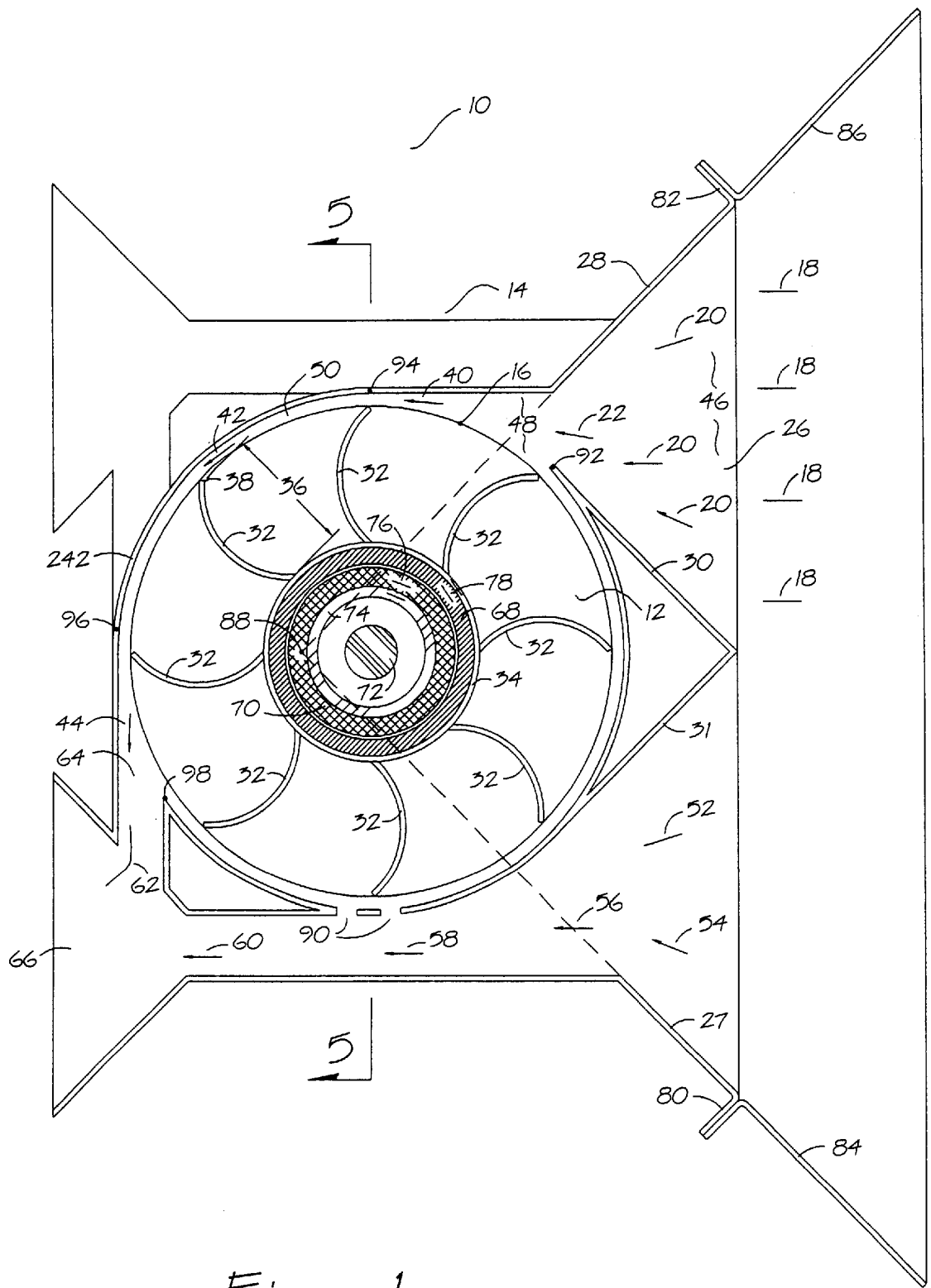
FIG. 1 is a sectional view of one preferred fluid-driven generator of the invention.

FIG. 1 is a sectional view of one preferred fluid-driven generator 10. In the preferred embodiment depicted, generator 10 is a counter-rotating tube turbine generator.

Referring to FIG. 1, it will be seen that generator 10 is comprised of a turbine impeller 12 disposed within a shroud 14. The shroud 14 may be made of conventional material such as, e.g., steel, aluminum, etc.

In one embodiment, shroud 14 is made of transparent material so that one can readily observe the inner workings of the generator 10. In one aspect of this embodiment, shroud 14 is comprised of or consists of or consists essentially of polycarbonate. In another embodiment, one or more other clear plastic materials (such as, e.g., clear acrylic) may also be used. In another aspect of this embodiment, some or all of shroud 14 is comprised of glass.

In the preferred embodiment depicted in FIG. 1, shroud 14 is comprised of means for directing incoming fluid towards a first tangential portion of the turbine impeller 12. In the embodiment depicted, a fluid, such as air, flows in the direction of arrows 18, 20, and 22 until it tangentially impacts the turbine impeller 12 at point 16. The means disclosed for so directing the fluid towards tangential point 16 is funnel 26.

In the embodiment depicted in FIG. 1, the funnel 26 is comprised of sidewall 28 and sidewall 30.

Part or all of the housing

One particular turbine impeller 12 is depicted in FIG. 1. However, other turbine impeller configurations also may be used. Reference may be had, e.g., to U.S. Pat. No. 6,249,058 (generator having counterrotating armature and rotor), U.S. Pat. No. 6,172,429 (hybrid energy recovery system), U.S. Pat. No. 4,606,697 (wind turbine generator), U.S. Pat. No. 4,328,428 (windspinner electricity generator), U.S. Pat. No. 4,075,545 (charging system for automotive batteries), U.S. Pat. No. 4,061,926 (wind driven electrical generator), U.S. Pat. No. 4,057,270 (fluid turbine), U.S. Pat. No. 3,974,396 (electrical generator), U.S. Pat. No. 3,697,765, and the like. The entire disclosure of each of these United States patents is hereby incorporated by reference into this specification.

The United States patents described in the prior paragraph relate to counter-rotating wind generators comprising two cylindrical impellers. The United States patents described in this paragraph refer to counter-rotating wind generators with two propeller-type impellers. See, e.g., U.S. Pat. No. 6,278,197 (contra-rotating wind turbine system), U.S. Pat. No. 6,127,739 (counter-rotating wind turbine), U.S. Pat. No. 5,506,453 (conversion of wind energy to electrical energy), U.S. Pat. No. 4,038,848 (wind operated generator), and the like. The entire disclosure of each of these United States patents is hereby incorporated by reference into this specification.

Referring again to FIG. 1, and in the preferred embodiment depicted therein, the turbine impeller 12 is comprised of a multiplicity of impeller vanes 32 which, in the embodiment depicted, are arcuate. These vanes 32 are preferably radially disposed around impeller core 34.

In the embodiment depicted, the vanes 32 are preferably equidistantly spaced around impeller core 34. Thus, inasmuch as there are 8 vanes depicted in the embodiment of FIG. 1, such vanes a preferably disposed 45 degrees from each other around impeller core 34. As will be apparent, fewer or more such vanes 32 may be used. Thus, e.g., one may use as few as two such vanes 32 up to as many as, e.g., 100 such vanes 32. It is preferred, in one embodiment, to utilize from about 4 to about 16 such vanes 32. In one embodiment, from about 6 to about 12 such vanes 32 are used.

Referring again to FIG. 1, each vane 32 was a height 36 extending from the impeller core 34 to the tip 38 of the vane 32. In the apparatus 10 of this invention, it is preferred that most of the fluid (such as air) be directed to impact the vanes 32 at a point or points that are located more than 50 percent of the distance from core 34. Without wishing to be bound to any particular theory, applicant believes that when fluid/air is directed to the top half of the impeller vanes 32, the turbine will operate more efficiently. Thus, when reference is made in this specification to tangentially directing the fluid/air to the impeller 12, it should be understood that such air is preferentially directed towards the top half of the impeller vanes 32.

Referring again to FIG. 1, the fluid/air that tangentially contacts the vane(s) 32 at point 16 then flows in the direction of arrows 40, 42, and 44 while it simultaneously contacts vanes 32 during such passage. Because the air flows from an area of greater volume 46 to an area of smaller volume 48 and to an area of yet smaller volume 50, the velocity of the air flow will increase, and the efficiency of the turbine assembly 10 will also increase.

In one embodiment, depicted in FIG. 1, air flows both in the direction of arrows 52, 54, 56, 58 and combines with air flowing in the direction of arrow 62 through exhaust tubes 64 and 66. As will be apparent, a venturi effect is created by the intersection of these two air flows, resulting in a force pulling air from tube 66 out of exhaust tube 64. Reference may be had, e.g., to U.S. Pat. Nos. 5,600,106, 5,550,334, 5,280,827, 6,045,060, 6,042,089, and the like. The entire disclosure of each of these United States patents is hereby incorporated by reference into this specification. As is known to those skilled in the art, this venturi effect causes a drop in pressure.

In one embodiment, not shown, the sidewalls 27 and 31 are omitted from the structure, and no venturi effect is created.

Referring again to FIG. 1, and in the preferred embodiment depicted therein, a magnet 68 is caused to rotate around a counter-rotating coil 70. Such a structure in which a coil is rotated in one direction and a magnet is rotated in another direction is well known. Reference may be had, e.g., to U.S. Pat. Nos. 6,249,058, 6,172,429, 4,606,697, 4,328,428, 4,075,545, 4,061,926, 4,057,270, 3,974,396, 6,278,197, 6,127,739, 5,506,453, 4,039,848, 5,783,894, 5,262,693, 5,089,734, 4,056,746, 4,021,690, 3,925,696, 3,191,080, 2,696,585, and the like. The entire disclosure of each of these United States patents is hereby incorporated by reference into this specification.

In the embodiment depicted in FIG. 1, shaft 72 does not rotate. Connected to shaft 72 by means of bearings (not shown in FIG. 1) is a tube 74 to which the coil 70 is attached. This tube 74/coil 70 assembly is induced to rotate in one direction 76, whereas the magnet 68 is induced to rotate in the opposite direction 78. As will be apparent, these directions can be reversed as long as the magnet 68 and the coil 70 each rotate in directions opposite to each other.

Referring again to FIG. 1, and in the preferred embodiment depicted therein, it will be seen that shroud 14 is comprised of flanges 80 and 82 which allow the addition of funnel sections 84 and 86. As will be apparent, depending upon the length of funnel sections 84 and 86, and/or their configuration(s), one can vary the amount of funneling effect exerted upon incoming air. It is preferred that the funnel sections 84 and 86, when extending an imaginary intersection point 88, form about a ninety degree angle. Put another way, each funnel section 84 and 86 should form an acute angle with a line bisecting the intersection point 88, such acute angle varying from about 30 to about 45 degrees.

Referring again to FIG. 1, and in the preferred embodiment depicted therein, shroud 14 is comprised of a multiplicity of weep holes 90 to allow the escape of moisture and/or excess air into exhaust tube 66.

In the embodiment depicted in FIG. 1, each of the magnet 68 and the coil 70 is shown as being one continuous, integral element. In another embodiment, not shown, the magnet 68 and/or the coil 70 is comprised of separate, non-integral elements which also may be non contiguous. In the embodiment depicted in FIG. 1, the air flowing around the turbine impeller 12 is confined by shroud 14, that provides a relatively small passageway or passageways, for input and exhaust of such fluid. As will be seen from FIG. 1, only from points 92 to 94, and from points 96 to 98, is the fluid/air relatively unconstricted. It is preferred to constrict the fluid/air over at least 90 degrees of the periphery of the turbine impeller 12, and, more preferably, at least about 120 degrees of such periphery. In one embodiment, the fluid/air is consticted over a least about 150 degrees. In another embodiment, the fluid/air is constricted over at least about 300 degrees. When the air is so constricted, its pressure is superatmospheric, being greater than about 14.7 pounds per square inch.

In the embodiment depicted in FIG. 1, the unconstricted area between points 92 and 94 is about the same as the unconstricted area between points 96 and 98. In another embodiment, not shown, the former unconstricted area is larger than the latter unconstricted area. In yet another embodiment, not shown, the latter unconstricted area is larger than the former unconstricted area. As will be apparent, by varying the properties and sizes of such unconstrictued areas, one will affect the air flow through the device 10.

Figure 2:
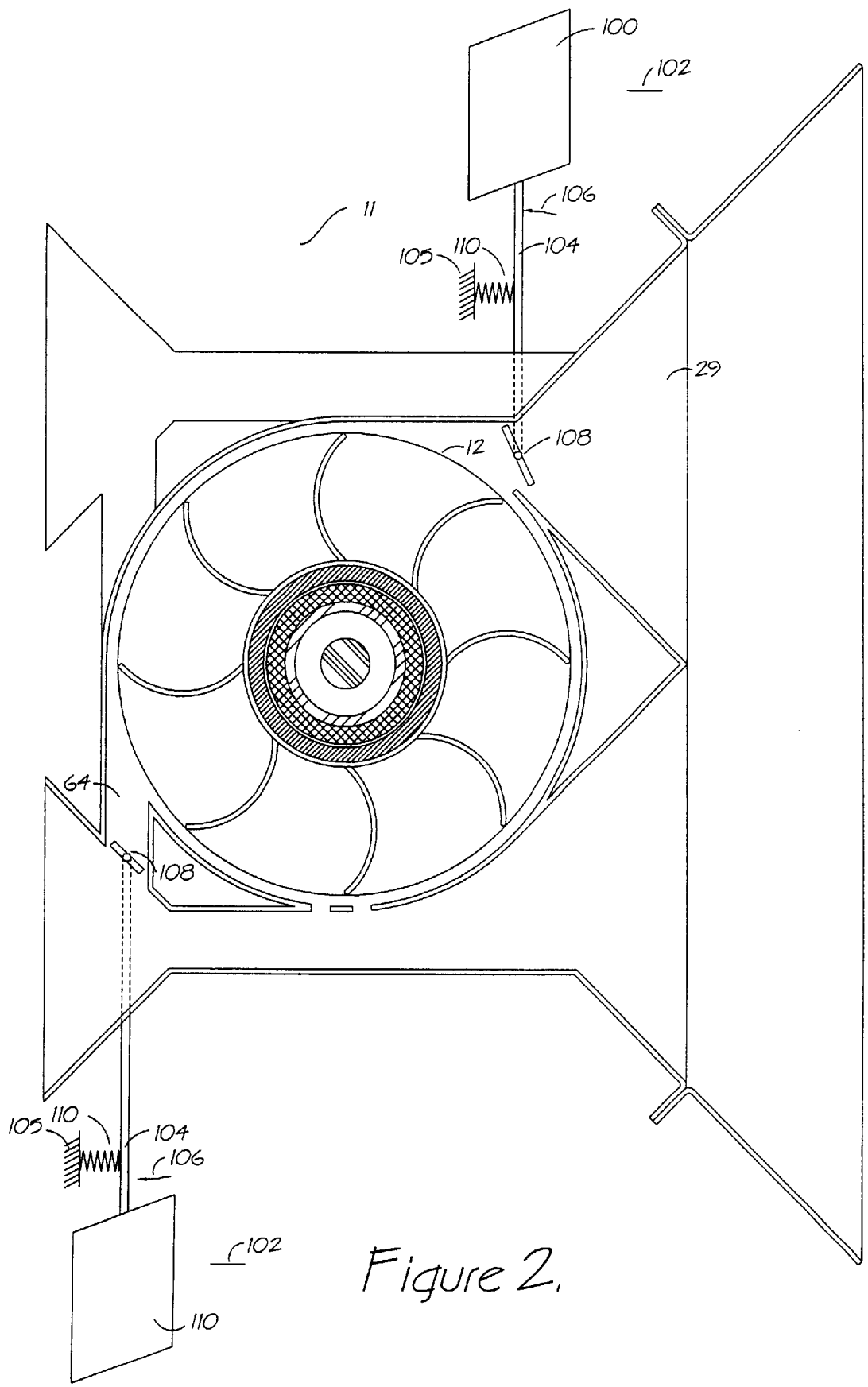
FIG. 2 is a sectional view of another preferred fluid-driven generator of the invention.

FIG. 2 is a sectional view of another turbine assembly 11 from which unnceccessary detail and/or identification has been omitted for the sake of simplicity of representation. Referring to FIG. 2, it will be seen that the turbine assembly 11 is comprised of means 100 for varying the volume of air flowing into the turbine impeller assembly, and the volume of air exiting the turbine assembly.

Referring to FIG. 2, and in the preferred embodiment depicted therein, it will be seen that, pivotally attached to shroud sidewall 29 is sail 100. As air flowing in the direction of arrow 102 forces sail 100 to move in the same direction, it displaces arm 104 in a counterclockwise direction 106. When arm 104 is displaced in direction 106, it causes butterfly valve 108 to move, to open, and to allow air flow through it; in the embodiment depicted, biasing means 110 is connected between arm 104 and stationary element 105. Thus, the movement of sail 100 allows an increased volume of air to flow into the impeller 12.

Conversely, when the amount of air flowing in the direction of arrow 102 decreases, the butterfly valve 108 will tend to close and decrease the amount of air flowing into the impeller 12. Thus, the device 11 is self-regulating. As the velocity of the fluid/air impacting it changes, the amount of fluid/air allowed through it also changes.

Referring again to FIG. 2, and in the embodiment depicted, a similar sail assembly is connected to the exhaust tube 64 of the device. In this embodiment, although a butterfly valve 108 is depicted, it will be apparent that other suitable valve assemblies and/or techniques may be used.

Figure 3:
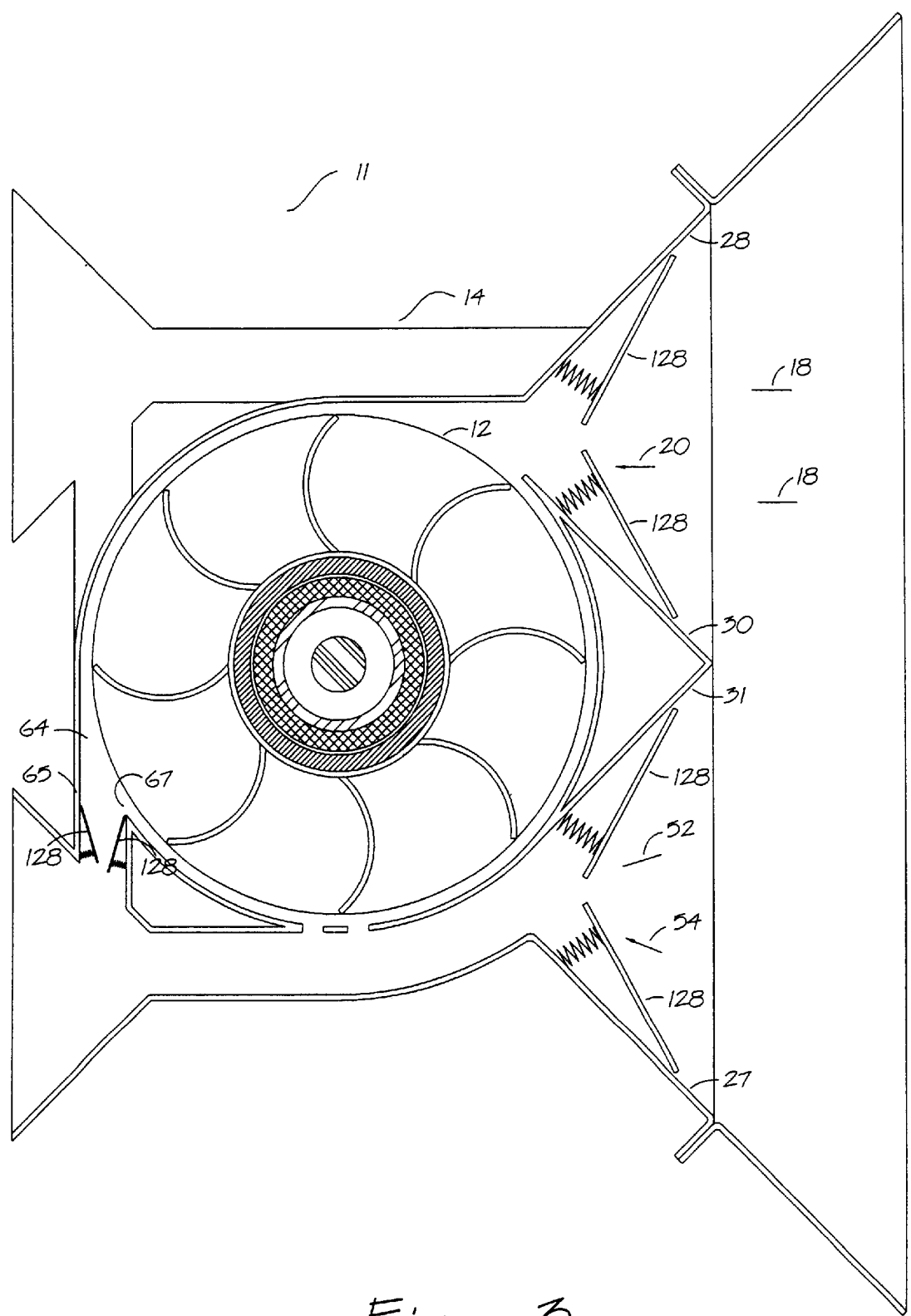
FIG. 3 is a sectional view of yet another preferred fluid-driven generator.

Other means for effecting this self-regulation function also may be used. Thus, for example, in the embodiment depicted FIG. 3, spring-biased valve assemblies 128 may be connected to sidewall 28 and/or sidewall 30 and/or exhaust tube wall 65 and/or exhaust tube wall 67. As air impacts one or more of such spring-biased valve assemblies, it causes such assemblies to deflect and thereby change the shape and the volume of the air intake or air exhaust ports. Such deflection will increase the amount of air allowed to enter or exit the assembly. Conversely, when the air speed decreases, the spring-biased valve assemblies will expand, and the amount of air allowed to enter or exist the ports will decrease.

Referring again to FIG. 3, and in the preferred embodiment depicted therein, spring-biased assemblies 128 will change their configurations as the wind speed entering in the directions of arrows 18 and 20 changes, and/or as the wind speed through orifice 64 changes. As will be apparent, the device depicted in FIG. 3 automatically adjusts the amount of intake and exhaust air depending upon such wind speeds.

Similarly, the spring biased assemblies 128 attached to sidewalls 27 and 31 adjust their configurations based upon the wind speed of air flowing in the directions of arrows 52 and 54.

Figure 4:
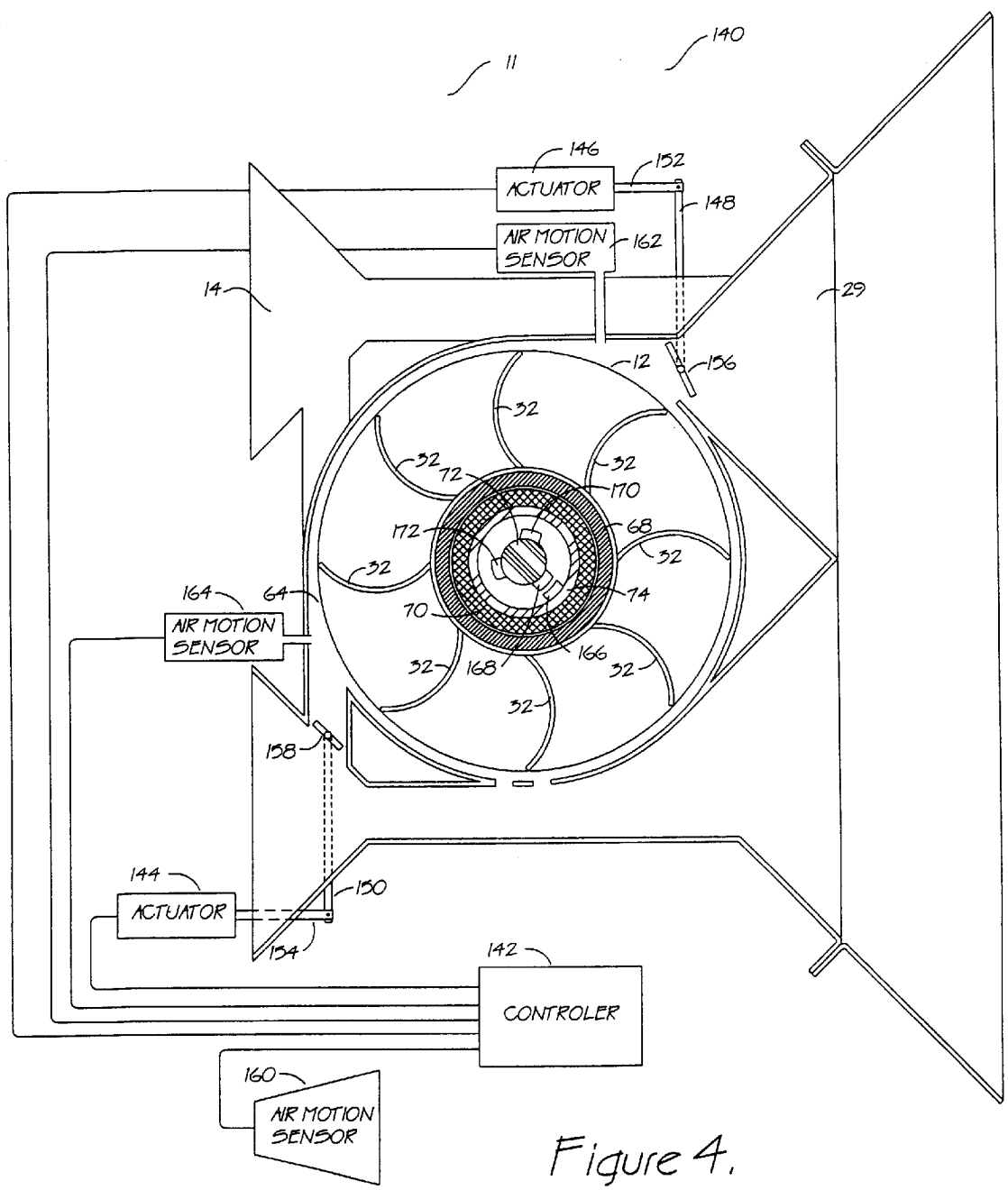
FIG. 4 is a sectional view of another preferred fluid-driven generator.

In another embodiment, illustrated in FIG. 4, a turbine assembly 140 is illustrated. Referring to FIG. 4, turbine assembly 140 is comprised of a controller 142 operatively connected to actuator 144 and 146.

Each of the actuators 144 and 146 is connected to an arm, 148 and 150, respectively. Each of arms 148 and 150 is pivotally connected to an actuator arm 152 and 154, respectively. Each of actuator arms 152 and 154 are connected to valves 156 and 158, respectively. As valves 156 and 158 change their position, the amount of air entering the turbine impeller 12, and the amount of air exiting the turbine impeller 12, be varied.

The positions of valves 156 and 158 may be independently varied by controller 142. Controller 142 receives information from air motion sensor 160, to which it is operatively connected. Such a connection may be made by a direct line; alternatively, such a connection may be made by telemetric means.

As will be apparent, the controller 142 may choose to vary the amount of air entering and/or exiting the assembly 140 depending upon, e.g., the amount of air flow exterior to the device. Alternatively, or additionally, the controller 142 may choose to vary the amount of air entering and/or exiting the assembly based upon data of air flow within the device 140. This data may be provided by means of air motions sensors 162 and 164, each of which is operatively connected to the controller 142.

Regardless of the means used, the sensors convey information to the controller 142 regarding the speed of rotation of turbine 12 as well as the wind flow within and without the turbine assembly.

Referring again to FIG. 4, and in the preferred embodiment depicted therein, it will be seen that assembly 140 is comprised of a rotation counter operatively connected (not shown) to the controller 142. In the embodiment depicted, a magnet 166 connected to the inner side of tube 74 comprises a Hall effect (or similar) sensor 168. Similar Hall effect sensors 170 and 172 are radially disposed about the shaft 72. These Hall effect sensors are well known. Reference may be had, e.g., to U.S. Pat. Nos. 5,502,283, 4,235,213, 5,662,824, 4,124,936, 5,542,493, and the like. The entire disclosure of each of these. United States patents is hereby incorporated by reference into this specification.

In another embodiment, motion sensors other than Hall effect sensors are used.

In another embodiment, not shown, a plurality of magnets are disposed on the inside of tube 74.

In yet another embodiment, the electrical output of the turbine is measured by an ammeter and/or a voltmeter (not shown) operatively connected to the controller 142. In yet another embodiment, not shown, the electrical load on the turbine 12 is measured by means (not shown) operatively connected to the controller 142.

In yet another embodiment, other environmental factors, such as the ambient temperature and the relative humidity, and the air density are sensed by the appropriate sensors and communicated to controller 142.

Figure 5:
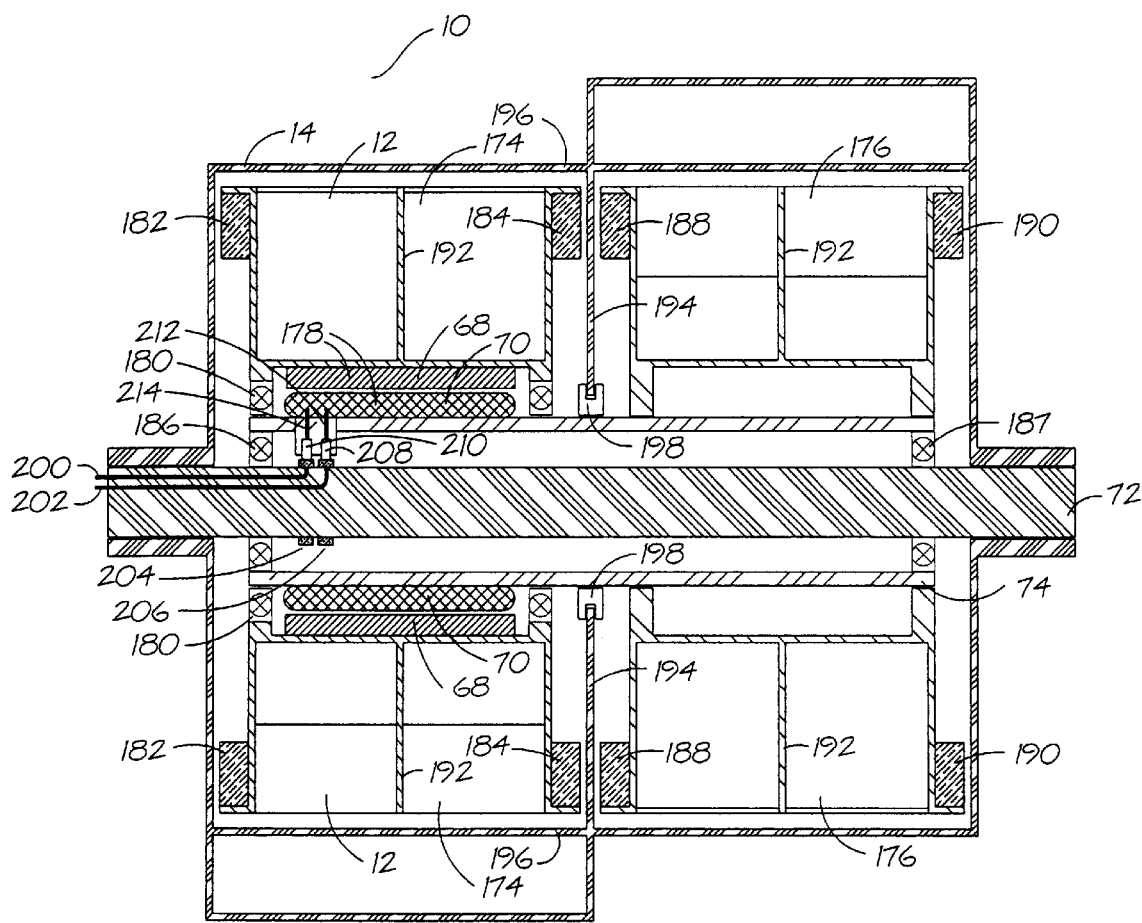
FIG. 5 is a sectional view of the generator of FIG. 1.

FIG. 5 is a sectional view of the turbine assembly 10, taken along lines 5—5 of FIG. 1. Referring to FIG. 5, it will be seen that assembly 10 is comprised of shroud 14, disposed within which is turbine assembly 174 and turbine assembly 176.

Turbine assembly 174 is a generator turbine, i.e., it is connected to generator 178. In the embodiment depicted, generator 178 is comprised of coil 70 and magnet 68.

In the embodiment depicted, the magnet 68 is connected to the generator turbine impeller 12 and rotates in one direction. The coil 70 is connected to tube 74 that is rotated by tube turbine 176 in a counter-rotating direction. Thus, as will be apparent, with this counter-rotating arrangement, the same amount of wind will cause about twice the relative motion between the coil 70 and the magnet 68.

Referring again to FIG. 5, the generator turbine 174 is rotatably mounted on turbine bearings 180, and flywheel weights 182 and 184 help maintain the inertia of generator turbine 174. Similarly, the tube turbine 176 is mounted on the tube 74 which, in turn, is rotatably mounted on tube bearings 186 and 187; the inertia of the tube is maintained by the flywheels 188 and 190. In the preferred embodiment depicted in FIG. 5, the tube bearings 186 and 187 are preferably mounted on stationary shaft 72.

In the preferred embodiment depicted in FIG. 5, reinforcing ribs 192 are used to reinforce the turbine impeller blades 32 (see FIG. 1).

Referring again to FIG. 5, it will be seen that shroud 14 is comprised of shroud separator wall 194 that extends from the outside wall 196 of the shroud to seal 198 and isolates the air system within turbine assembly 174 from the air system within turbine assembly 176.

In the embodiment depicted in FIG. 5, electricity is removed via conductors 200 and 202 that communicate with commutator rings 204 and 206, brushes 208 and 210, and coil connectors 212 and 214.

Figure 6:
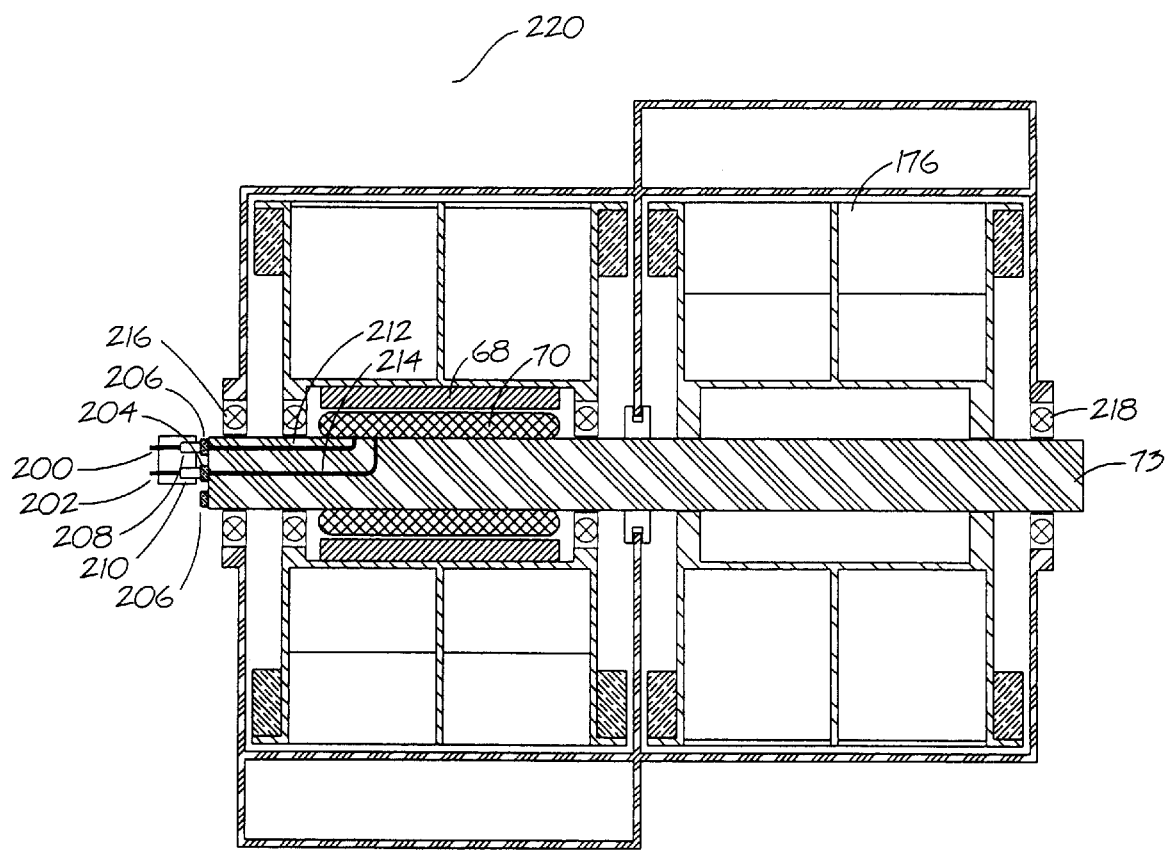
FIG. 6 is a sectional view of another fluid generator of the invention.

FIG. 6 is a sectional view of a turbine assembly 220. The assembly 220 differs from the assembly 10 in that tube 74 is omitted; shaft 73 is rotatable, being operatively connected to turbine 176; the coil 70 is mounted on rotatable shaft 73; bearings 216 and 218 support shaft 73; and the conductors 200/202, the commutator rings 204 and 206, the brushes 208 and 210 and the coil connectors 212 and 214 have different locations, as shown.

Figure 7:
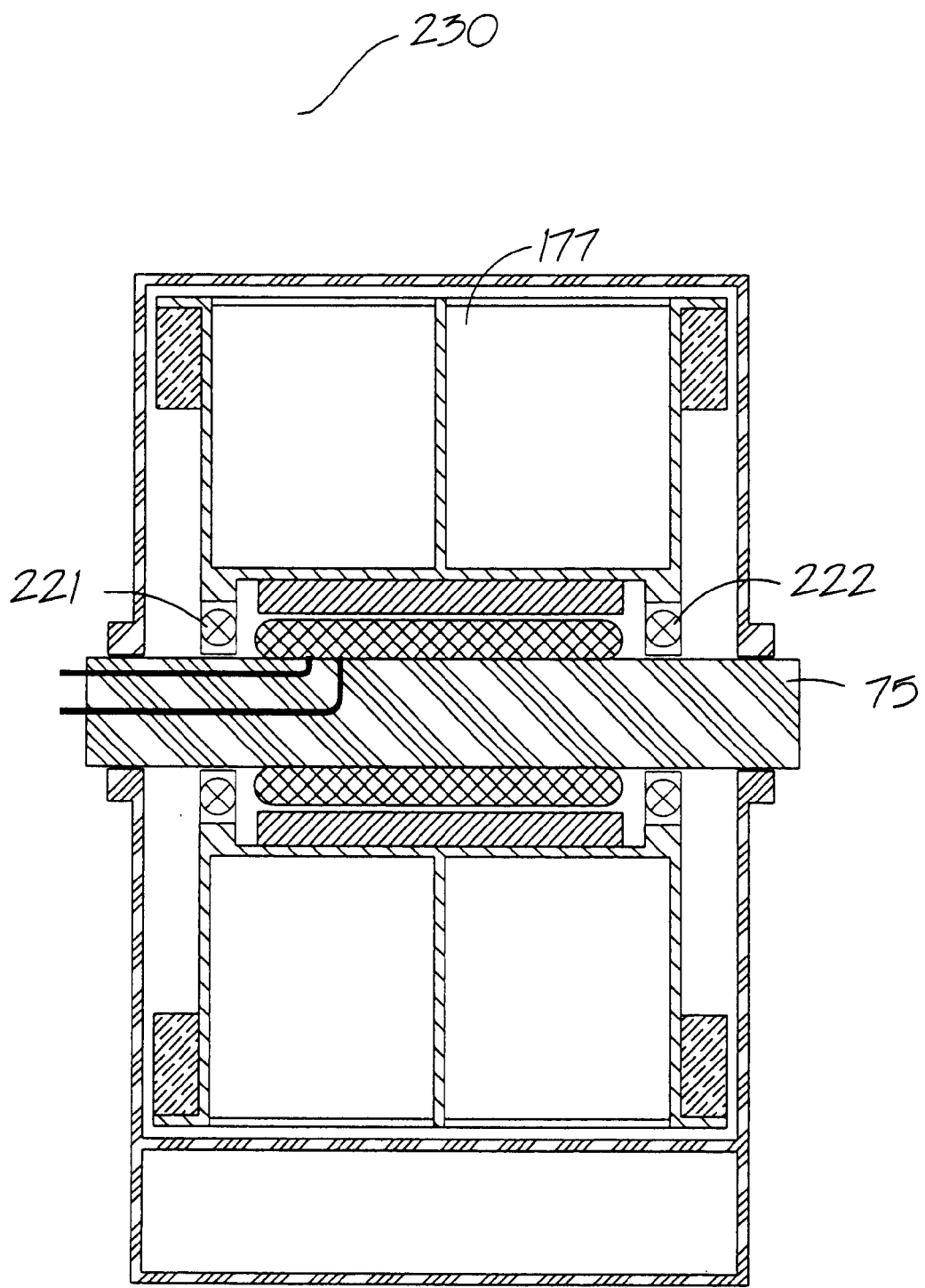
FIG. 7 is a sectional view of another fluid generator.

FIG. 7 is a sectional view of a turbine assembly 230. In this embodiment, there is only one turbine assembly 177 rotating around a fixed shaft 75 on bearings 221 and 222.

Figure 8:
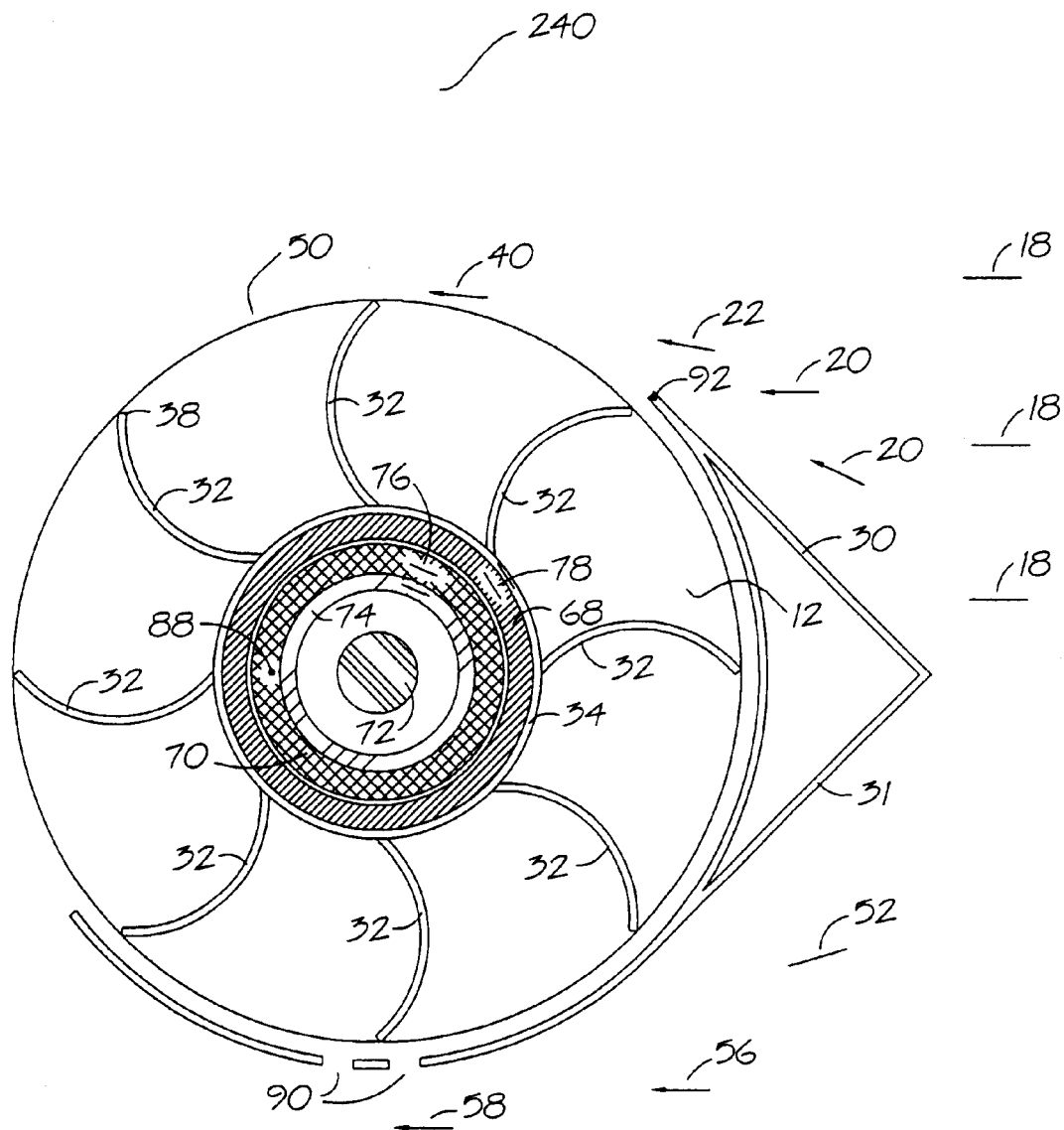
FIG. 8 is sectional view of yet another fluid generator of the invention.

FIG. 8 is a sectional view of a turbine assembly 240 which is similar to the turbine assembly depicted in FIG. 1 but omits certain elements of shroud 14, such as sidewalls 86, 28, 84, and 27. In addition, and referring to Figure, portion 242 of shroud 14 also is omitted, as are the walls that comprise exhausts 64 and 66. As will be apparent, although FIG. 8 depicts the device 240 rotating in one direction, it may also be connected to as similar device rotating in the opposite direction (see FIG. 5).

In one embodiment, the device of FIG. 8 is mounted on a tower. In another embodiment, the device of FIG. 8 is mounted on a rooftop. The devices of FIG. 8, and of the other Figures in this case, tend to vibrate less than prior art devices and, thus, are more suitable for many applications, including mounting on buildings.

Figure 9:
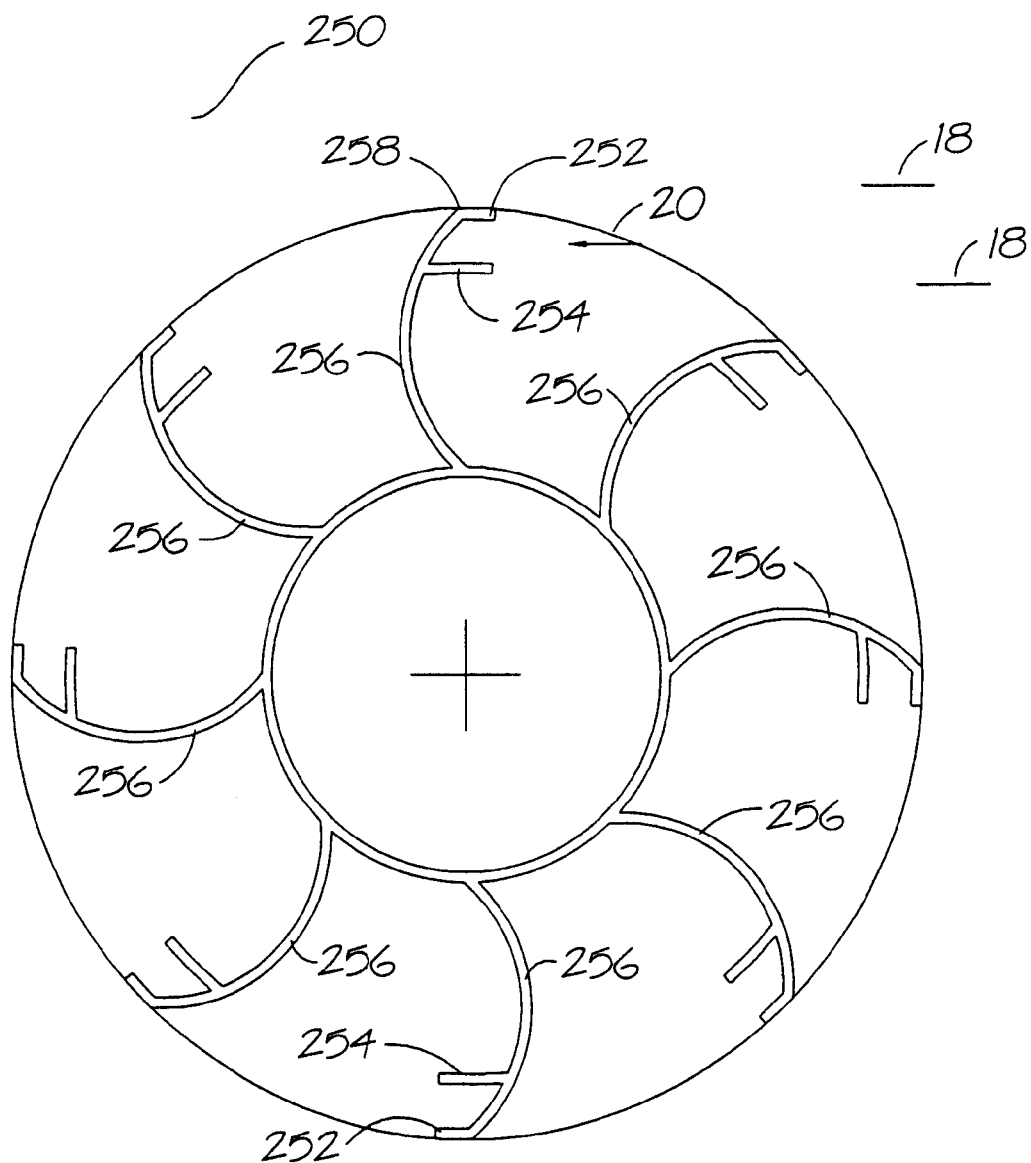
FIG. 9 is a sectional view of a generator impeller.

FIG. 9 is a sectional view of another turbine impeller 250 which is similar to turbine impeller 12 that comprises turbine impeller blade ribs 252 and 254. These ribs 252 and 254 are preferably located in the top third of the impeller blades 256; and they generally have a length that is at least about 0.1 times as great as the length of the impeller blades 256. These ribs 252 and 254 are adapted to stiffen the impeller blades 256 and concentrate the force created by the air flow 18 and 20 impacting the turbine blades 256 to the periphery 258 of turbine impeller 250, thereby increasing the mechanical advantage of air flow 18 and 20 and therefore the force exerted on the generator system.

Figure 10:
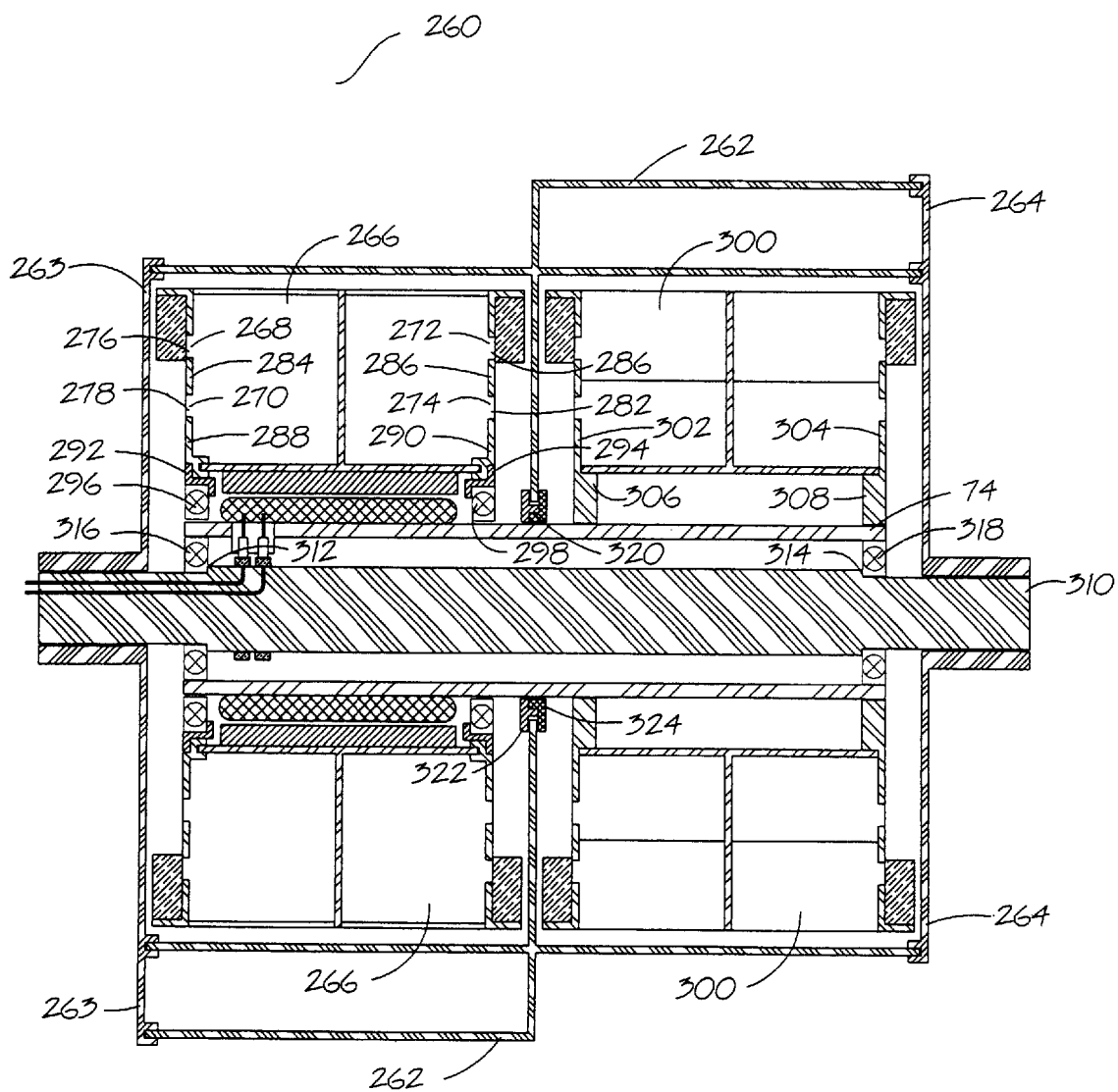
FIG. 10 is a sectional view of yet another generator.

FIG. 10 is a sectional view of a turbine assembly 260. The assembly 260 differs from the assembly 10 (see FIG. 5) in assembly 260 can be readily assembled and disassembled. Turbine assembly 260 is comprised of a central shroud structure 262, shroud end caps 263 and 264, and generator turbine impeller 266; turbine impeller 266 has assembly tabs 268, 279, 272, and 274 that insert into receiving slots 276, 278, 280, and 282 respectively.; and the receiving slots 276, 278, 280, and 282 are radially disposed on sidewalls 284 and 286 of turbine impeller hubs 288 and 290 respectively).

The assembly 260 also is comprised of central hubs 292 and 294 that position generator bearings 296 and 298 therebetween, and by their presence, position and rotationally support generator turbine impeller 266 about unchanged tube 74.

Referring again to FIG. 10, and in a manner similar to generator turbine impeller 266, generator turbine impeller 300 has assembly tabs that insert into receiving slots that are radially disposed on sidewalls 302 and 304 of turbine impeller hubs 306 and 308). Shaft 310 has steps 312 and 314 that position tube bearings 316 and 318, and seal 320 comprised of seal half 322 and 324 positioned on tube 74.

Figure 11:
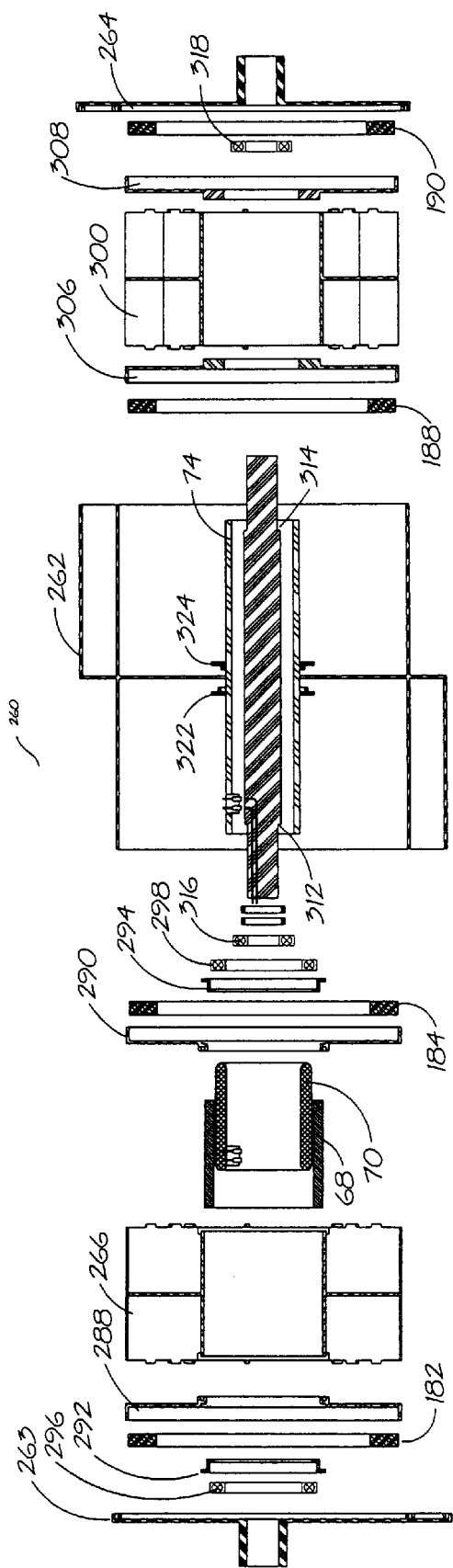
FIG. 11 is an exploded view of the generator of FIG. 10.

FIG. 11 is an exploded view of turbine assembly 260.

Figure 12:
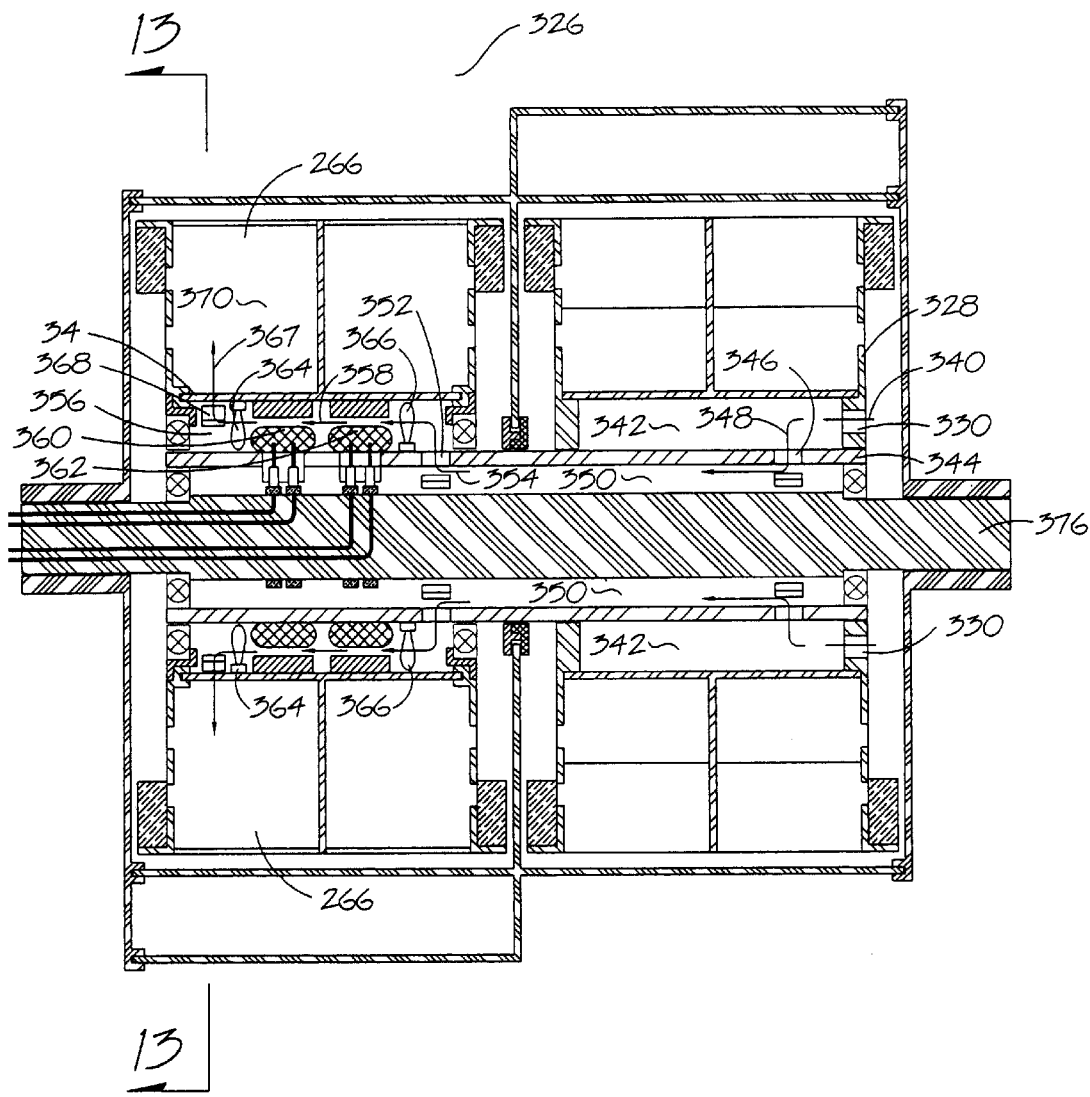
FIG. 12 is a sectional view of another generator of the invention.

FIG. 12 is a sectional view of a turbine assembly 326. The assembly 326 differs from the assembly 260 in that, in the former assembly, turbine sidewall 328 has 2 to 10 radiallly disposed slots 330 that permit air flow 340 to enter area 342. Tube 344 has radially disposed slots 346 to permit continued air flow 348 to enter area 350. Tube 344 has a second set of radially disposed slots 352 to again permit air flow 354 into generator housing area 356 where air flow 358 passes around and between one, or more generator assemblies 360 and 362 to carry away heat produced by the generators. Air flow is assisted through area 356 by fan blade assemblies 364 and 366 to exhaust as air flow 367 from area 356 through radially disposed slots 368 in generator impeller core 34 of impeller assembly 266 into area 370 where the heated air is dissipated. It should be noted that a plurality of conductors 372 and 374 can be located in shaft 376. Other means of providing air circulation by using the rotary motion of one or more of the turbine may be used to assist in propelling cooling air the generator area. It should also be noted that different generator designs with varying power generating capacities may be used.

Figure 13:
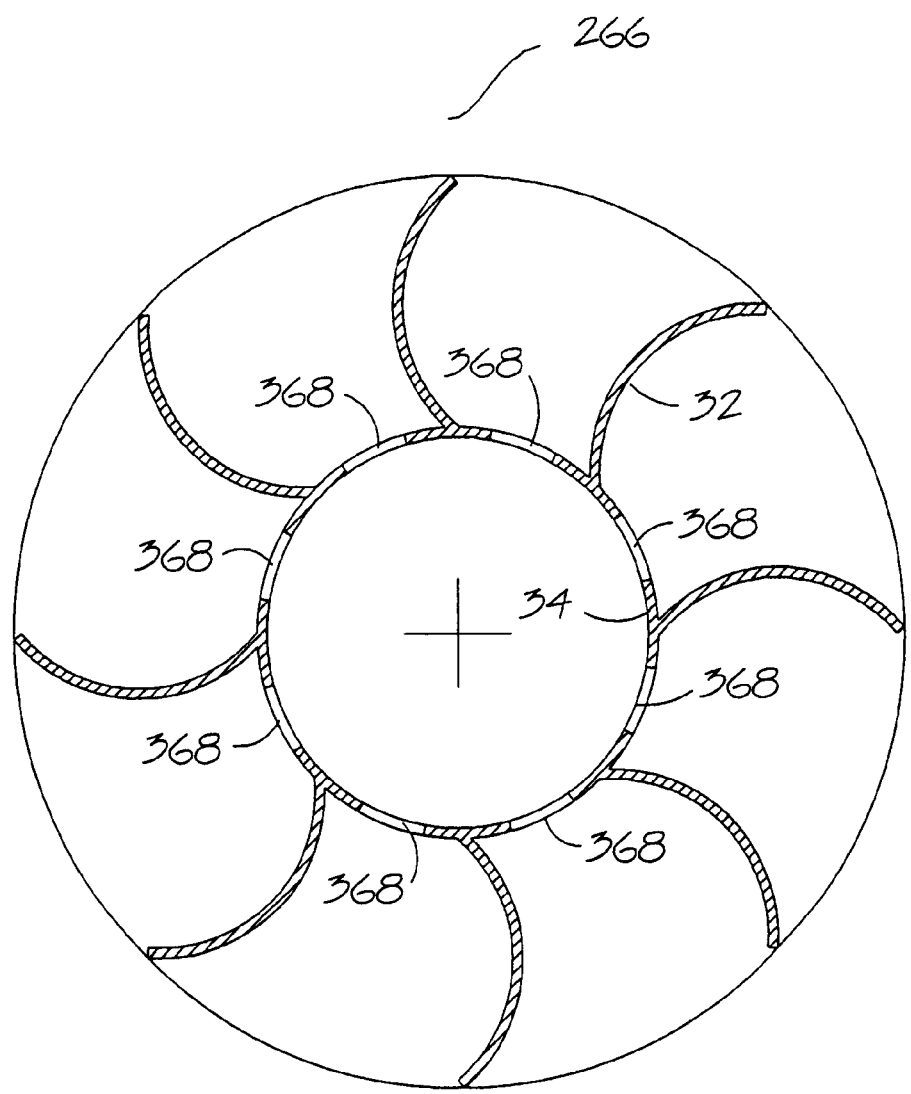
FIG. 13 is a sectional view of the impeller of the generator of FIG. 12.

FIG. 13 is a sectional view of generator impeller 266 showing airflow slots 368 in core 34 of impeller 266.

Figure 14:
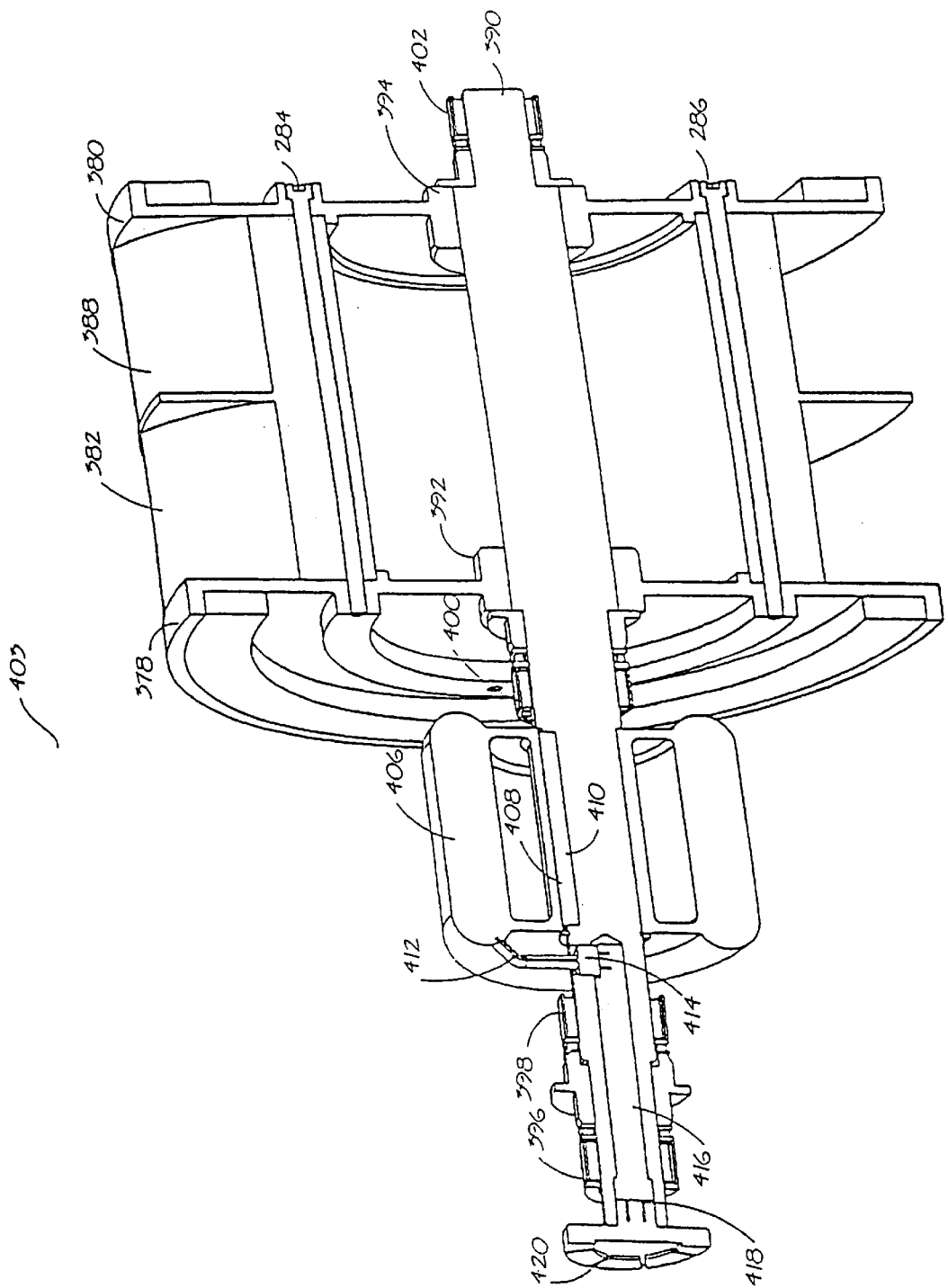
FIGS. 14 and 15 are partial perspective views of another generator of the invention.
Figure 16:
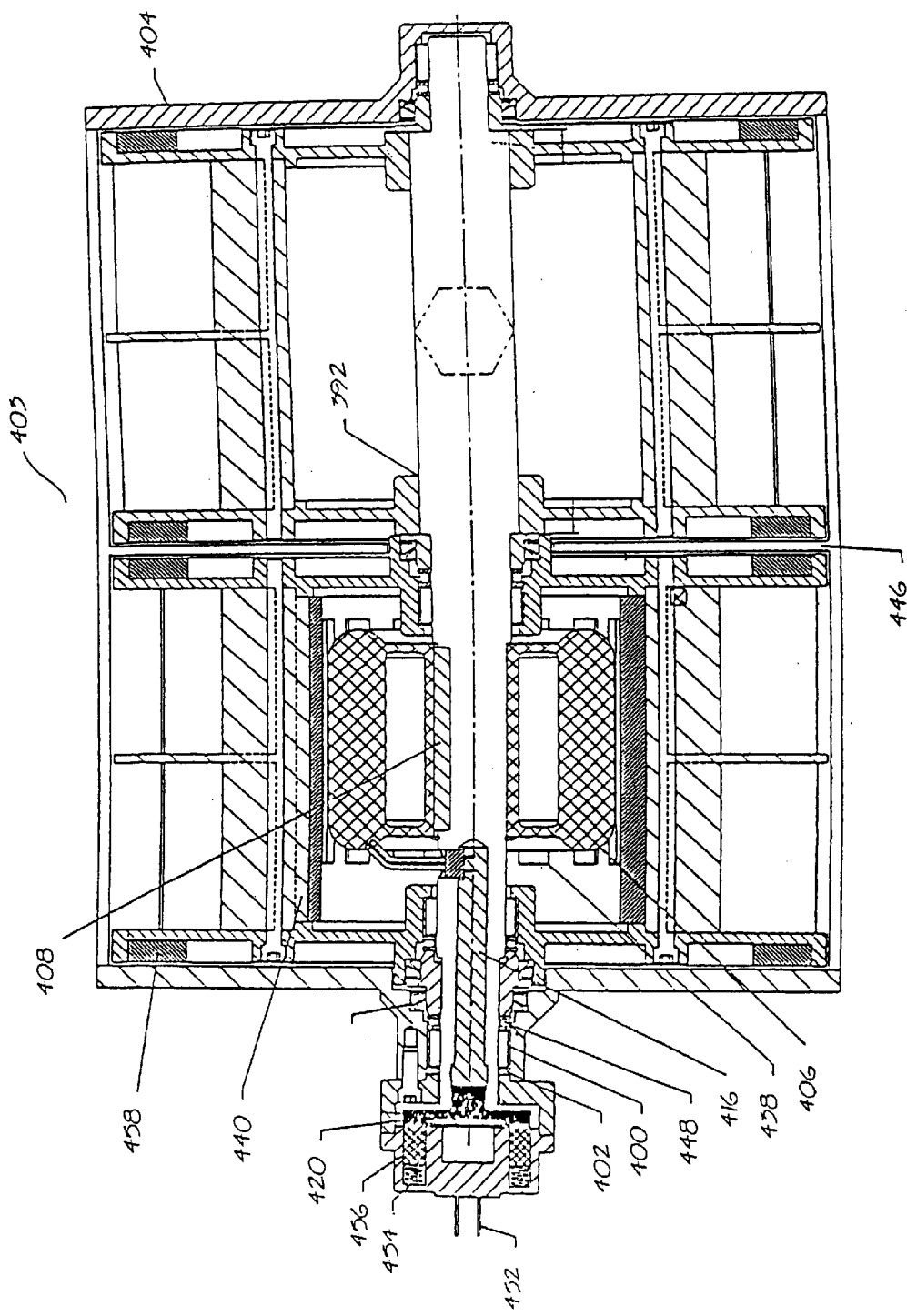
FIG. 16 is a sectional view of the generator of FIGS. 14 and 15.

FIG. 14 is a sectioned perspective view of a portion of a turbine generator 403 depicted in FIG. 16. This assembly 403 differs from turbine assembly 220 (see FIG. 6) in that turbine impeller hubs 378 and 380 are held in clamping contact with turbine impeller 382 by bolts 284 and 286 and two or more bolts (not shown). Impeller assembly 388 is rotationally fixed to shaft 390; shaft 390 has a polygonal cross section (not shown) that assembles to holes 392 and 394 of a similarly shaped polygonal cross section (not shown), such holes preferably being centrally located in hubs 378 and 380.

Shaft 390 is supported by bearings 396, 398, 400, and 402 that, in turn, are supported by turbine generator shroud 404 of the turbine generator assembly 403 depicted in FIG. 16. Adjacent to impeller assembly 388 is generator coil 406 that is rotationally fixed to shaft 390 by key 408 in shaft keyway 410 in shaft 390. Electric current generated by the coil is conducted out of the generator by conductor 412, connecter 414, conductor 416, and connecter 418, to commutator 420, all running through and attached to shaft 390.

Figure 15:
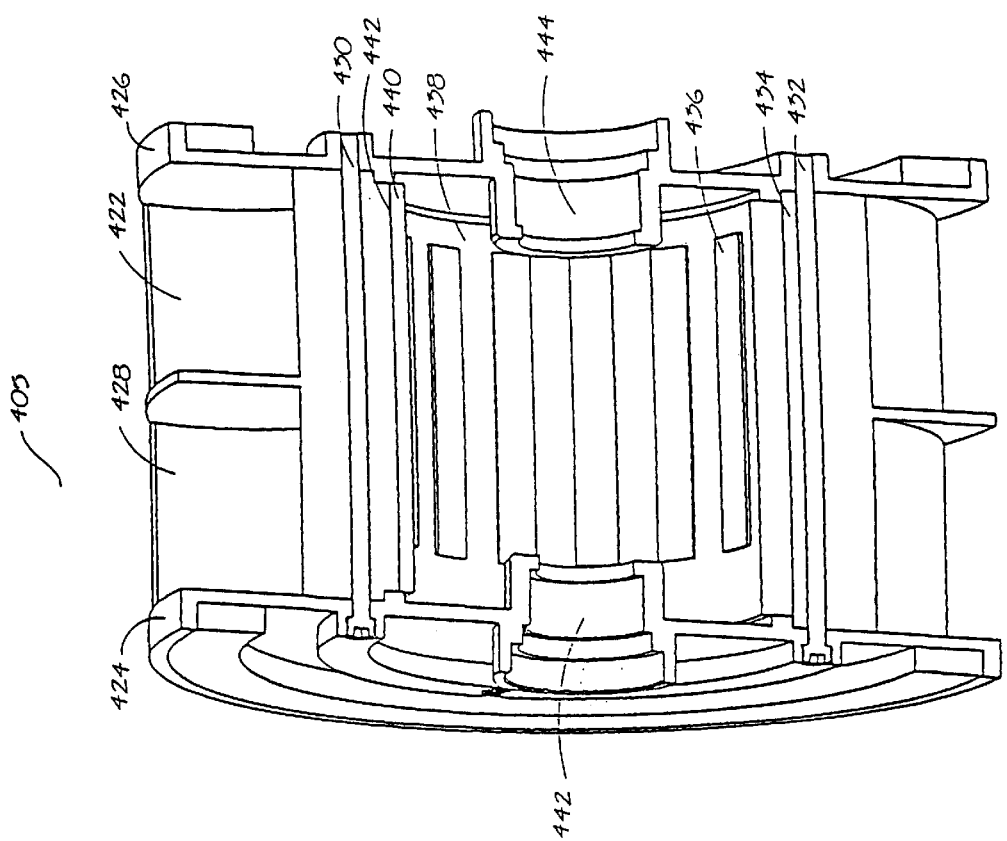

FIG. 15 is sectioned perspective view of the generator impeller portion 405 of turbine generator 403 that differs from turbine assembly 220 in that turbine impeller hubs 424 and 426 are held in clamping contact with turbine impeller 428 by bolts 430 and 432 and two, or more additional bolts (not shown). Radially disposed about interior wall 434 are magnets 436 positioned by a magnet carrier 438 and held in rotational position by key 440 in keyway 442 in interior wall 434 of impeller. Bearing ways 442 and 444 are axially positioned in impeller hubs 424 and 426, respectively, to hold bearings (shown in FIG. 14) 398 and 400, respectively.

FIG. 16 depicts turbine generator 403 comprising a shroud 404 with separating wall 446 enclosing a generator turbine assembly 422; the generator turbine assembly 442 includes a generator key 408, magnet carrier 438 and magnet carrier key 440, turbine impeller assembly 388, shaft 390 in hole 392 with bearings 396, 398, 400 and 402, coil 406 held by key 408 in keyway 410, conductors 412 and 416, connecters 414 and 418, and commutator 420. In the embodiment depicted, the assembly 388 also comprises a conductor 416, a thrust bearing 448, a bearing 400, a trim spacer 402 (to compensate for axial tolerances), a power outlet 452, brush springs 454, and brushes 456.

Figure 17:
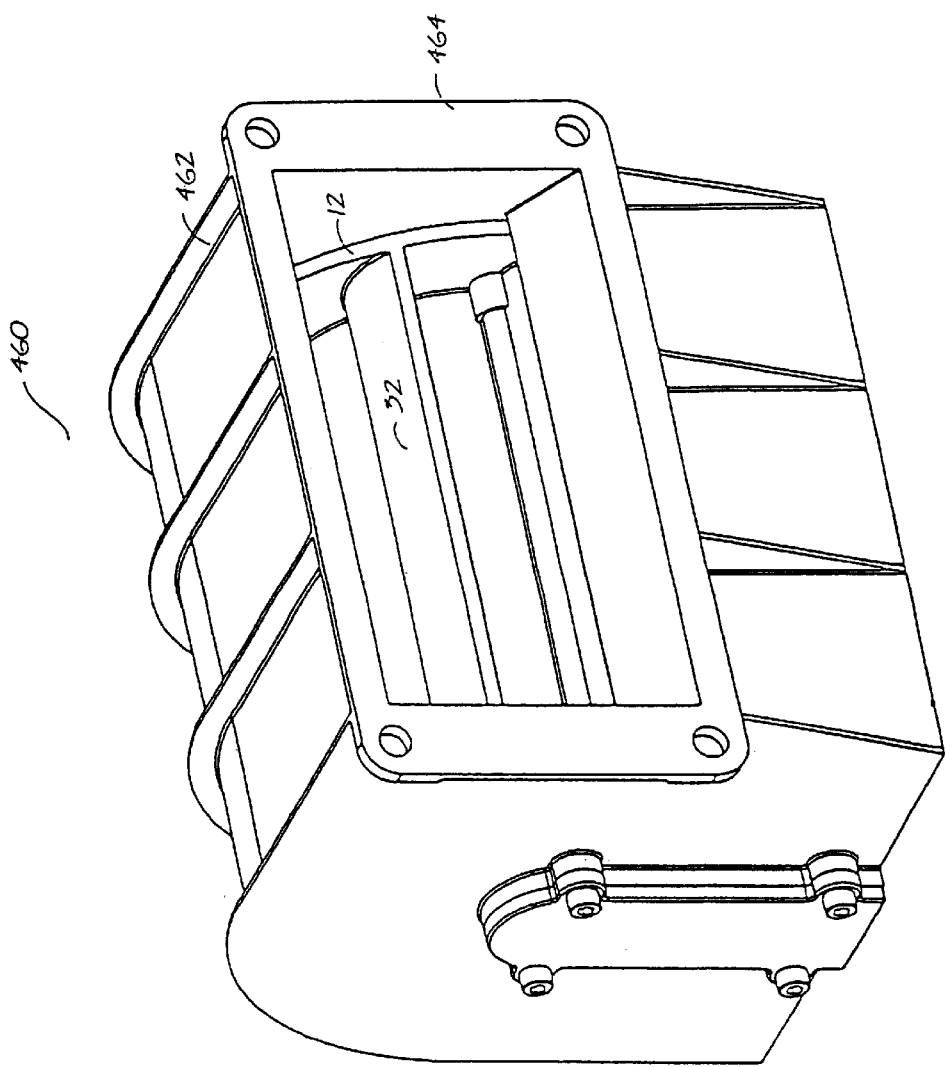
FIG. 17 is a perspective view of a generator assembly.

FIG. 17 is a perspective view of a turbine generator 460 within a shroud 462 with mounting flange 464. Mounting flange 464 may be used to attach air-directing sidewalls (not shown) to improve generator performance.

FIG. 18A is a perspective view of a shroud 466 adapted to receive three turbines (not shown). FIG. 18B is a back perspective view of the shroud 466. FIG. 18C is a front view of the shroud 466. FIG. 18D is a perspective view of a support 468 for the shroud 466. FIG. 18E is a top view of the support 468.

An Electrical Generator with Auxiliary Vacuum Assist Means

In the remainder of this specification, applicants will discuss an electrical generator with vacuum assist means.

Figure 19:
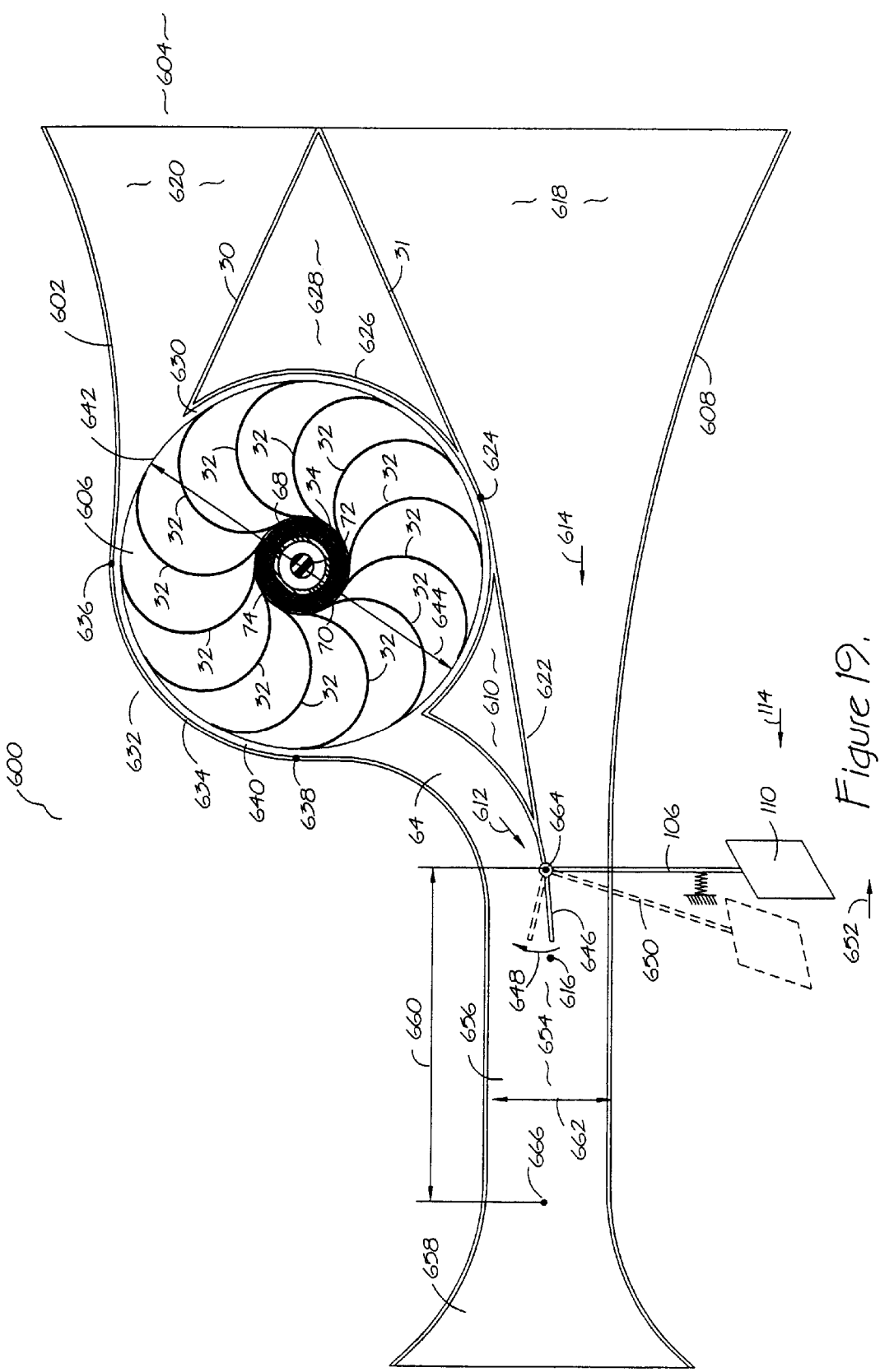
FIG. 19 is a sectional view of another preferred generator of this invention.

FIG. 19 is a sectional view of generator assembly 600 which is similar to the assembly 10 depicted in FIG. 1 but differs therefrom in several respects.

Referring to FIG. 19, the assembly 600, the top wall 602 is preferably arcuate. Without wishing to be bound to any particular theory, applicants believe that arcuate wall 602 provides a smooth transition for the air flowing past it from the funnel entrance 604 to the periphery of the turbine impeller 606.

In the embodiment depicted in FIG. 19, bottom wall 608 also is preferably arcuate.

In another embodiment, not shown, either or both of air flow diverter walls 30 and 31 may also be arcuate.

In the embodiment depicted in FIG. 19, an air flow director 610 is disposed between the turbine exhaust air flow 612 and the incoming bypass air flow 614 to smoothly combine such air flows. The air flow director 610 is adapted to create a vacuum at point 616. As will be apparent to those skilled in the art, such a vacuum is most likely to be formed when the velocity of the turbine exhaust air flow 612 is less than the velocity of the incoming bypass air flow 614.

One means of maximizing such velocity difference is to insure that the area 618 through which the incoming bypass air flows is substantially larger than the area 620 through which the turbine exhaust air flows. It is preferred that area 618 be at least 1.1 times as great as area 620. In one embodiment, area 618 is at least 1.5 times as great as area 620. In another embodiment, area 618 is at least 2 times as great as area 620.

Referring again to FIG. 19, it will be seen that wall 622 of air flow diverter 620 is joined to wall 31 at point 624. Point 624 is chosen that both wall 622 and wall 31 are substantially tangential to the peripheral wall 626 of the front diverter 628.

In one embodiment, illustrated in FIG. 19, the surface formed by the combination of walls 622 and 31 are shaped similarly to the surface of wall 608. In one aspect of this embodiment, if wall 608 were to be flipped 180 degrees, it would be substantially congruent with the surface formed by such combination of walls 622 and 31. Without wishing to be bound to any particular theory, applicants believe that such similar arcuate shapes facilitate good air flow and, thus, the formation of vacuum at point 616.

Referring again to FIG. 19, it will be seen that peripheral wall 626 encloses a substantial portion of the outer periphery of turbine impeller 606. In one embodiment, at least about 30 degrees of such outer periphery of turbine impeller 606 are so enclosed. In another embodiment, at least about 90 degrees of such outer periphery of turbine impeller 606 are so enclosed. In yet another embodiment, at least about 180 degrees of such outer periphery of turbine impeller 606 are so enclosed. In yet another embodiment, at least about 270 degrees of such outer periphery of turbine impeller 606 are so enclosed.

It is preferred that the distance 630 between the peripheral wall 626 and the periphery of the turbine impeller 606 be as small as possible. In one embodiment, the distance 630 is less than about 2 inches. In another, the distance 630 is less than about 1 inch. In yet another embodiment, the distance 630 is less than about 0.5 inches. In yet another embodiment, the distance 630 is less than about 0.2 inches.

Referring again to FIG. 19, and in the preferred embodiment depicted therein, it is preferred that the cowling 632 is comprised of a peripheral wall 634 that extends from point 636 to point 638. Between points 636 and 638, the peripheral wall 634 has an arcuate shape that is similar to the shape of peripheral wall 626 and is disposed at a distance 640 from the periphery 642 of the turbine impeller 606. The distance 640 may be substantially constant from points 636 to 638, or it may vary. In either case, such distance preferably will be less than about 2.0 inches, more preferably less than about 1 inches, and even more preferably less than about 0.5 inches. In one embodiment, the distance 640 is no greater than the distance 630.

In one embodiment, the ratio of the turbine diameter 644 to either the distance 630 or the distance 640 is from about 10/1 to about 100/1 and, more preferably, from about 20/1 to about 60/1. In one embodiment, such ratio is from about 40/1 to about 60/1.

In the embodiment depicted in FIG. 19, twelve turbine impeller blades 32 are used.

In the embodiment depicted in FIG. 19, the assembly 600 is comprised of means for varying the vacuum at point 616. Many different means can be used for varying such vacuum. In the embodiment depicted, sail 110 is connected to vacuum flap 646. Flap 646 is pivotally connected to air flow diverter 610.

As air flows past sail 110 in the direction of arrow 114, it will tend to move sail 110 in the direction of arrow 114. Such movement will cause vacuum flap 646 to divert upwardly, in the direction of arrow 648, and to assume the position 650 depicted in dotted line outline. In this configuration, the vacuum flap 646 will diminish the turbine exhaust air flow 612, thereby changing the differential between air flow 612 and air flow 614.

As will be apparent, to the extent, if any, that air flows in the direction of arrow 652, the opposite effect will occur, and the vacuum flap 646 will be diverted downwardly, thereby again changing the differential between air flow 612 and air flow 614.

Referring again to FIG. 19, it will be seen that an exhaust chamber 654 is disposed behind the air flow diverter 610. This exhaust chamber 654 is comprised of a constant area section 656 and a varying expansion section 658.

The constant area section 656 has a length 660 and a width 662 such that the ratio of length 660 to width 662 is from about 1 to about 5, and preferably from about 2 to about 4. In one aspect of this embodiment, the ratio of length 660 to width 662 is from about 2.5 to about 3.5.

Referring again to FIG. 19, and in one embodiment, the cross sectional area of section 656 from point 664 to point 666 is substantially constant, i.e., it varies by no more than plus or minus 10 percent.

In one embodiment depicted in FIG. 19, the vacuum flap 646 has a length that is less than the height 662 divided by two.

The sections 656 and 658 may have a cross-sectional shape that may be square, rectangular, circular, oval, poloygonal, and the like. In one embodiment, sections 656 and 658 have the same cross-sectional shape. In another embodiment, sections 656 and 658 have different cross-sectional shapes.

The vaccum flap 646 preferably has an end shape that is similar to the cross-sectional shape of the section 656 so that, when such flap is deflected to its maximum degree, it will form a substantially constant gap between the end of such flap (not shown) and the interior of the section 656. Thus, e.g., if the section 656 has a substantially square shape, the vacuum flap end should have a similar square shape.

Referring again to FIG. 19, air flows through an optional varying expansion section 658 which allows the exhaust gas to expand as it exhausts the atmosphere.

Figure 20:
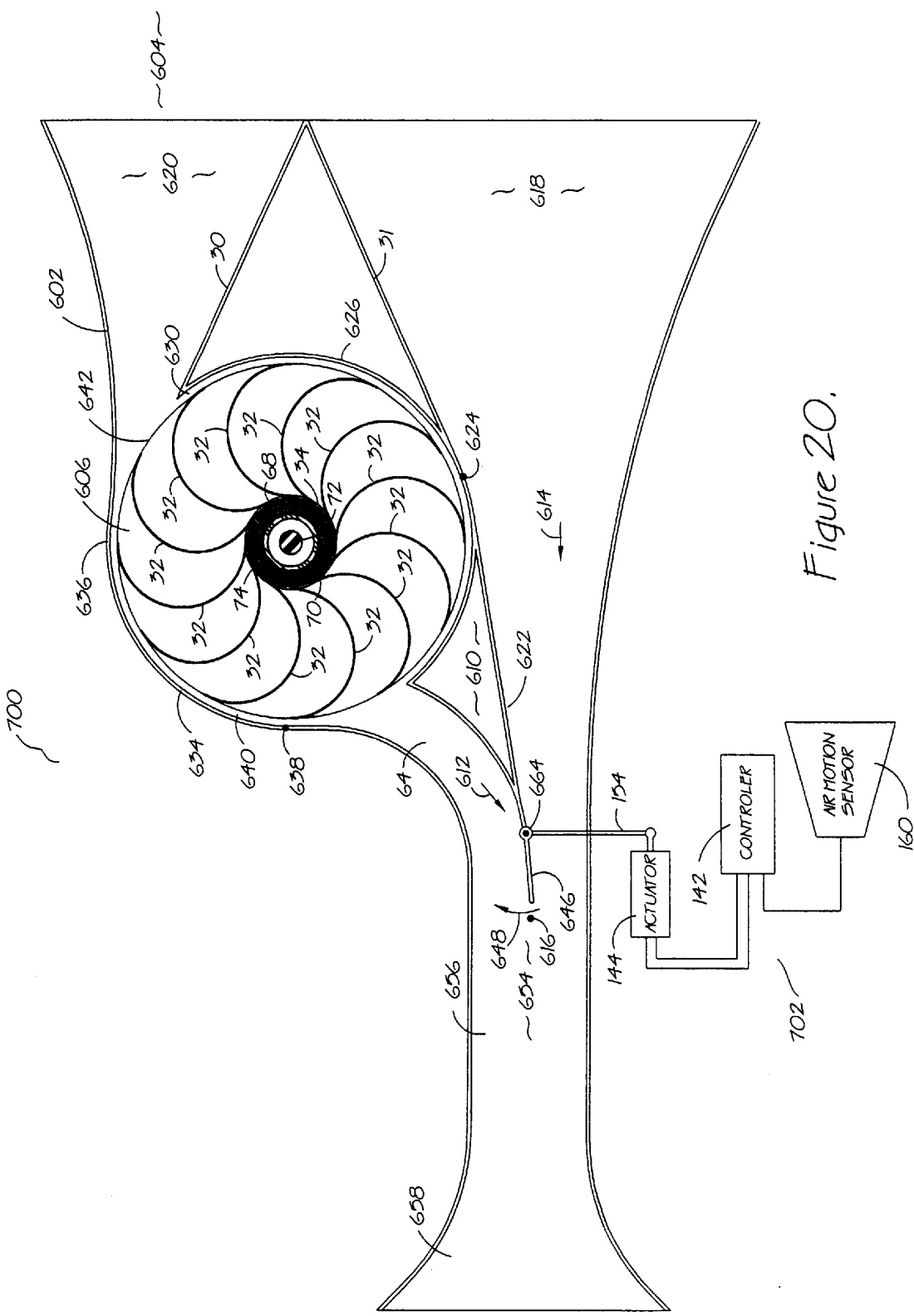
FIG. 20 is a sectional view of another preferred generator of this invention.

FIG. 20 is a sectional view of another preferred generator 700 which is similar to the generator 600 depicted in FIG. 19 but differs therefrom it that a different means 702 is used to vary the position of vacuum flap 646. The means 702 is comprised of a controller 142, an actuator 144, an actuator arm 154, and an air motion sensor 160, each of which is also illustrated in FIG. 4 and discussed in the specification by reference to such FIG. 4.

As will be apparent to those skilled in the art, the actuator arm 154 will be moved in response to the perceived air velocity, in the manner described elsewhere in this specification. This movement will translate into movement of the vacuum flap 646, which will vary the vacuum at point 616.

Figure 21B:
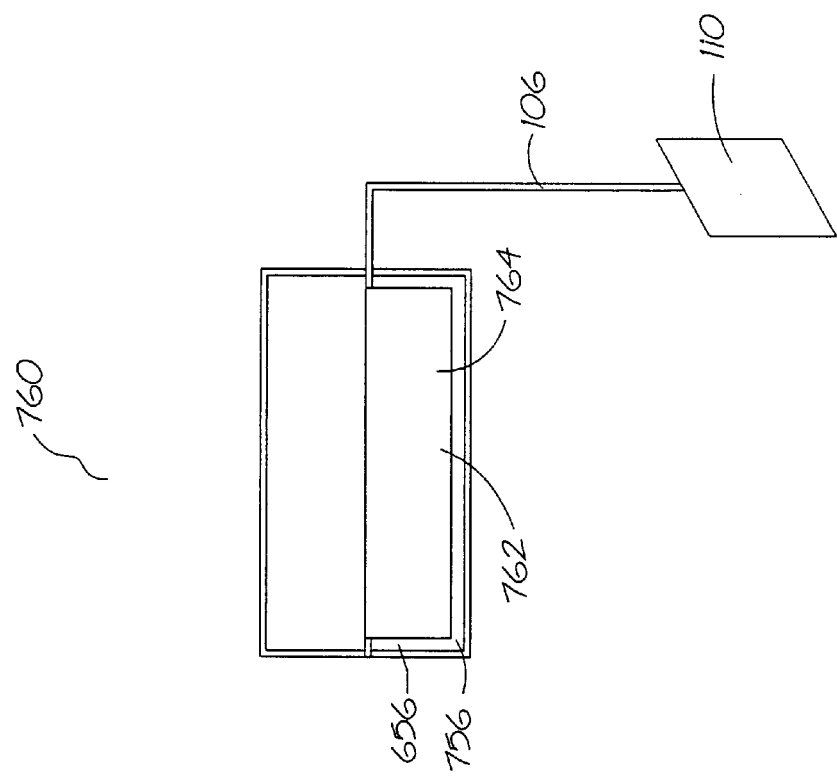
FIG. 21B is another partial sectional view of the vacuum generating device of FIG. 19.
Figure 21A:
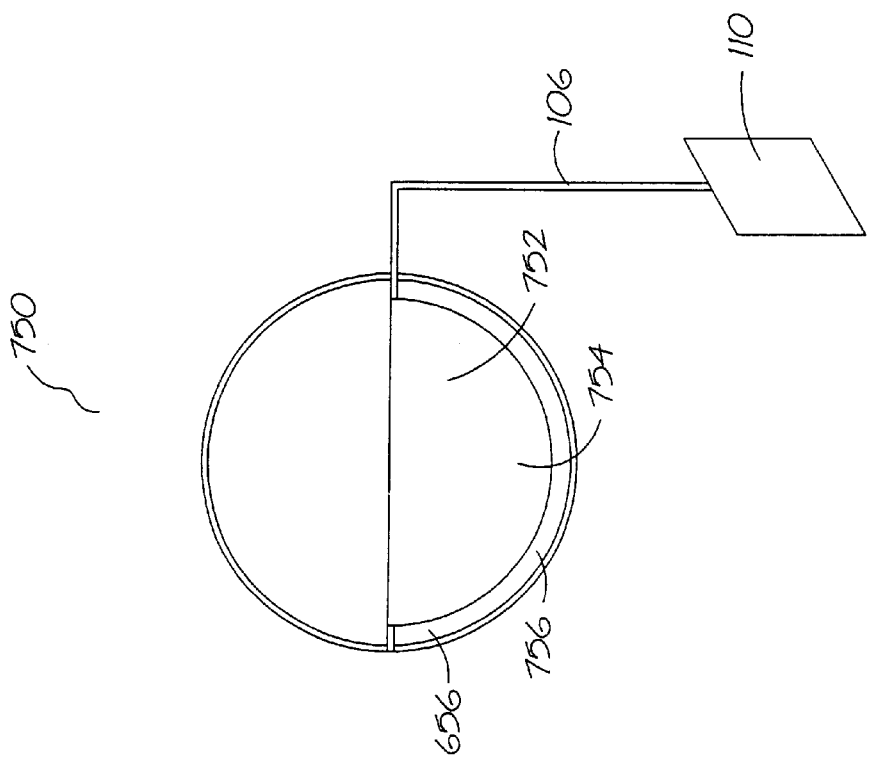
FIG. 21A is partial sectional view of the vacuum generating device of FIG. 19.

FIG. 21A is an end view of the generator 750 . In the embodiment depicted in FIG. 21A, the vacuum flap 752 is comprised of a bottom section 754 that has a substantially semicircular cross-sectional shape that conforms substantially to the semicircular shape of the constant area section 656. In the embodiment illustrated in this FIG. 21A, the gap 756 has a substantially constant width.

FIG. 21B is an end view of a generator 760 that is similar the generator 750 but differs therefrom in that vacuum flap 762 is comprised of a bottom section 764 that has a substantially rectilinear cross-sectional shape.

Figure 22A:
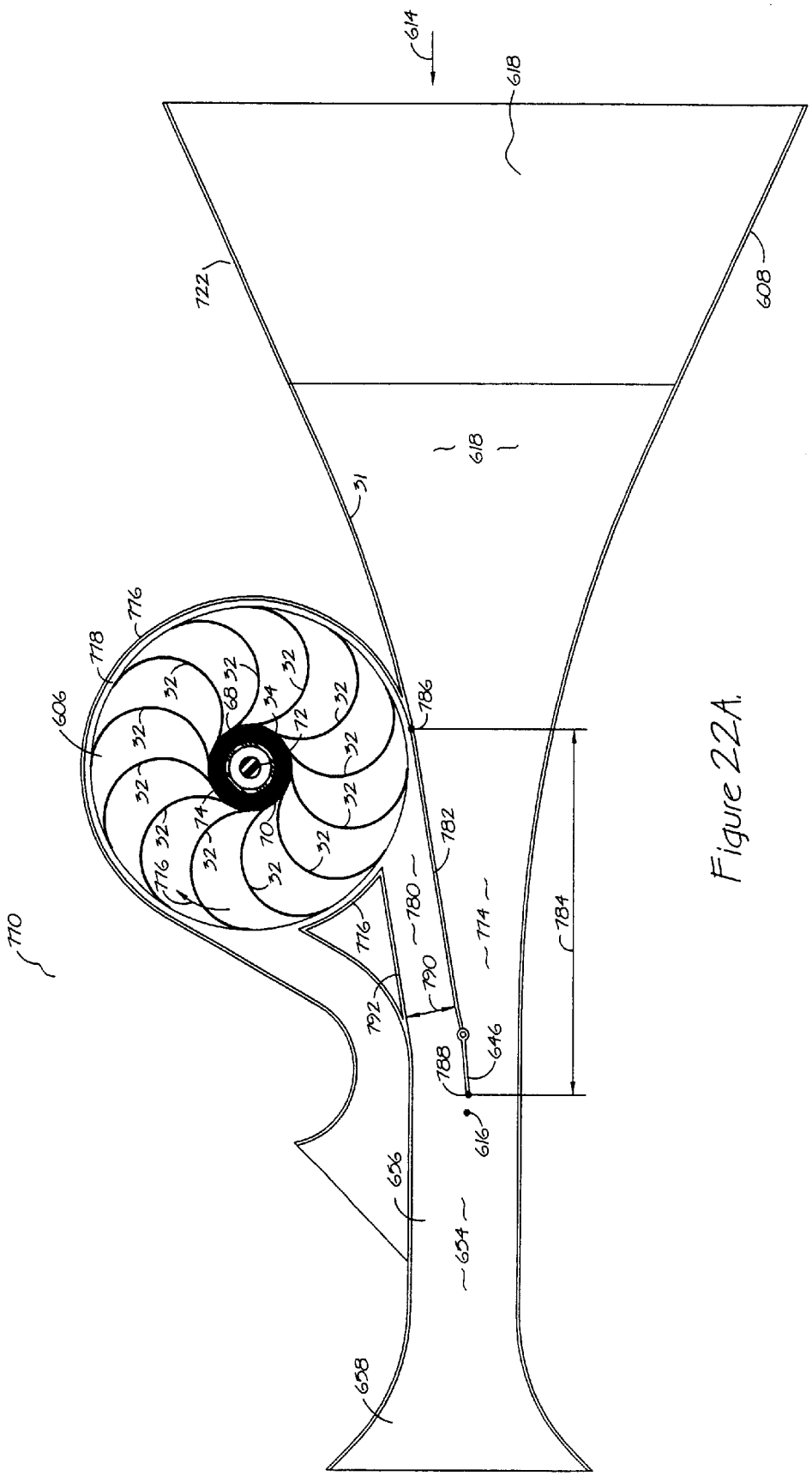
FIG. 22A is a sectional view of a vacuum generating device.

FIG. 22A is a sectional view of a vacuum generator 770 that is similar in many respects to the device depicted in FIG. 19 but differs therefrom in its operation. In the operation of vacuum generator 770, air flows into area 618 of housing 772 in the direction of arrow 614; this air is referred to as bypass air flow elsewhere in this specification.

The incoming bypass air flow 614 flows past vacuum flap 646, and through exhaust chamber 654. In this process, the incoming bypass air flow 614 is compressed in area 774.

Without wishing to be bound to any particular theory, applicants believe that the compression of the air flow 614 in area 774 tends to create a strong vacuum at point 616. It may well be that other factors are responsible for the production of such a vacuum. In an event, regardless of the cause(s), a sufficient vacuum is created at point 616 to cause the turbine impeller 606 to rotate in the direction of arrow 776.

In the embodiment depicted in FIG. 22A, the cowling 776 closely encloses the turbine impeller 606 over at least about 270 degrees of its periphery such that the gap 778 between the cowling 776 and the periphery of the turbine impeller 606 is less than a specified amount.

In general, the gap 778 is preferably substantially the same as the gap 640, described elsewhere in this specification.

In the embodiment depicted in FIG. 22A, an exhaust chamber 780 is comprised of a lower wall 782. The lower wall 782 extends a distance 784 from point 786 to point 788. Point 786 is the point at which the lower wall 782 diverges from the cowling 776, and point 788 is the point at which the vacuum flap 646 ends. In general, the distance 784 is at least about 2.0 times the distance 790, between the lower wall 782 and the upper wall 792. In one embodiment, distance 784 is at least 3.0 times the distance 790.

Figure 22B:
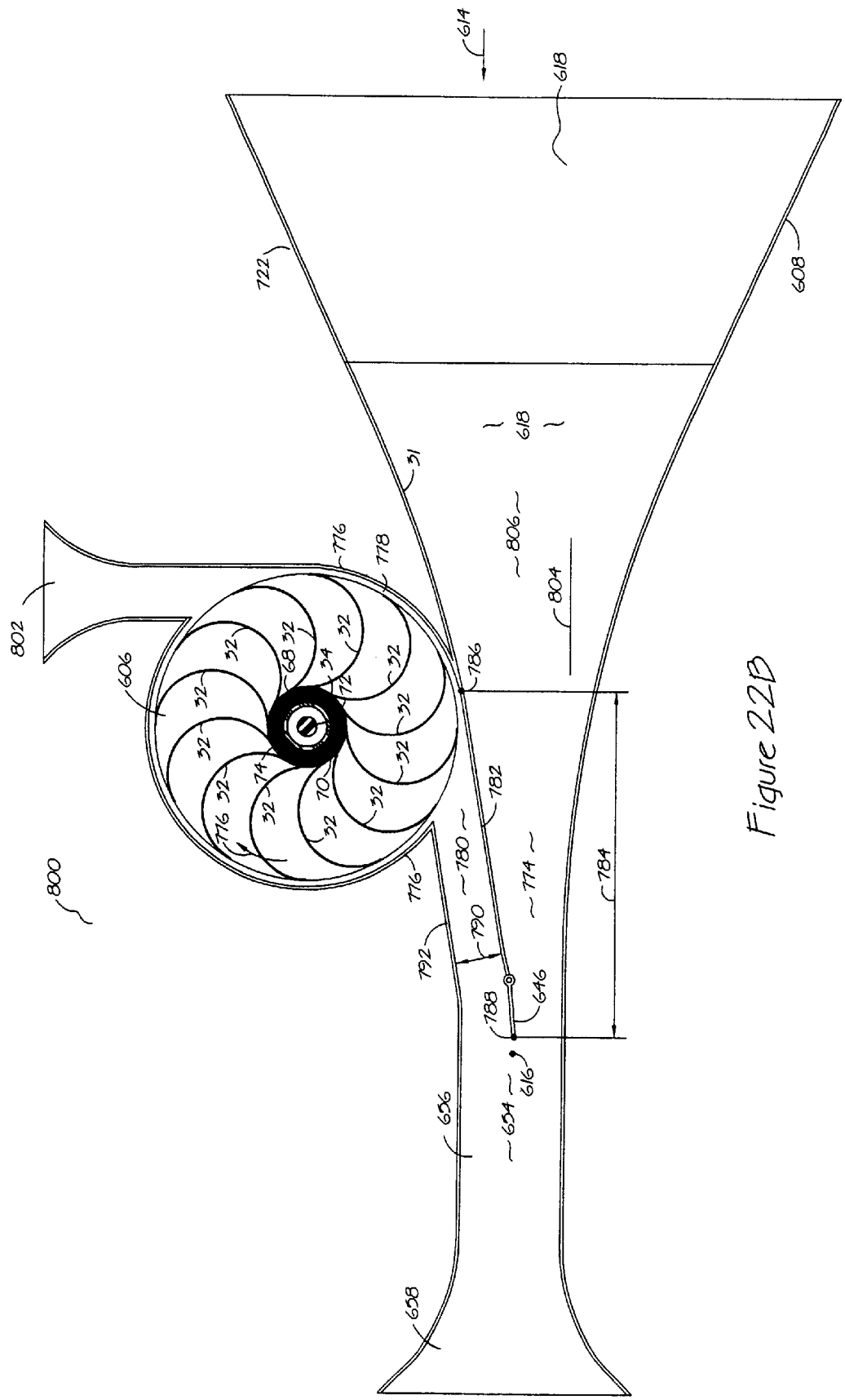
FIG. 22B is another sectional view of a vacuum generating device.

FIG. 22B is a sectional view of another generator 800 which is similar to the generator 770 but differs therefrom the input 802 is disposed substantially perpendicularly to the horizontal axis 804 of the cowling assembly 806.

Figure 22C:
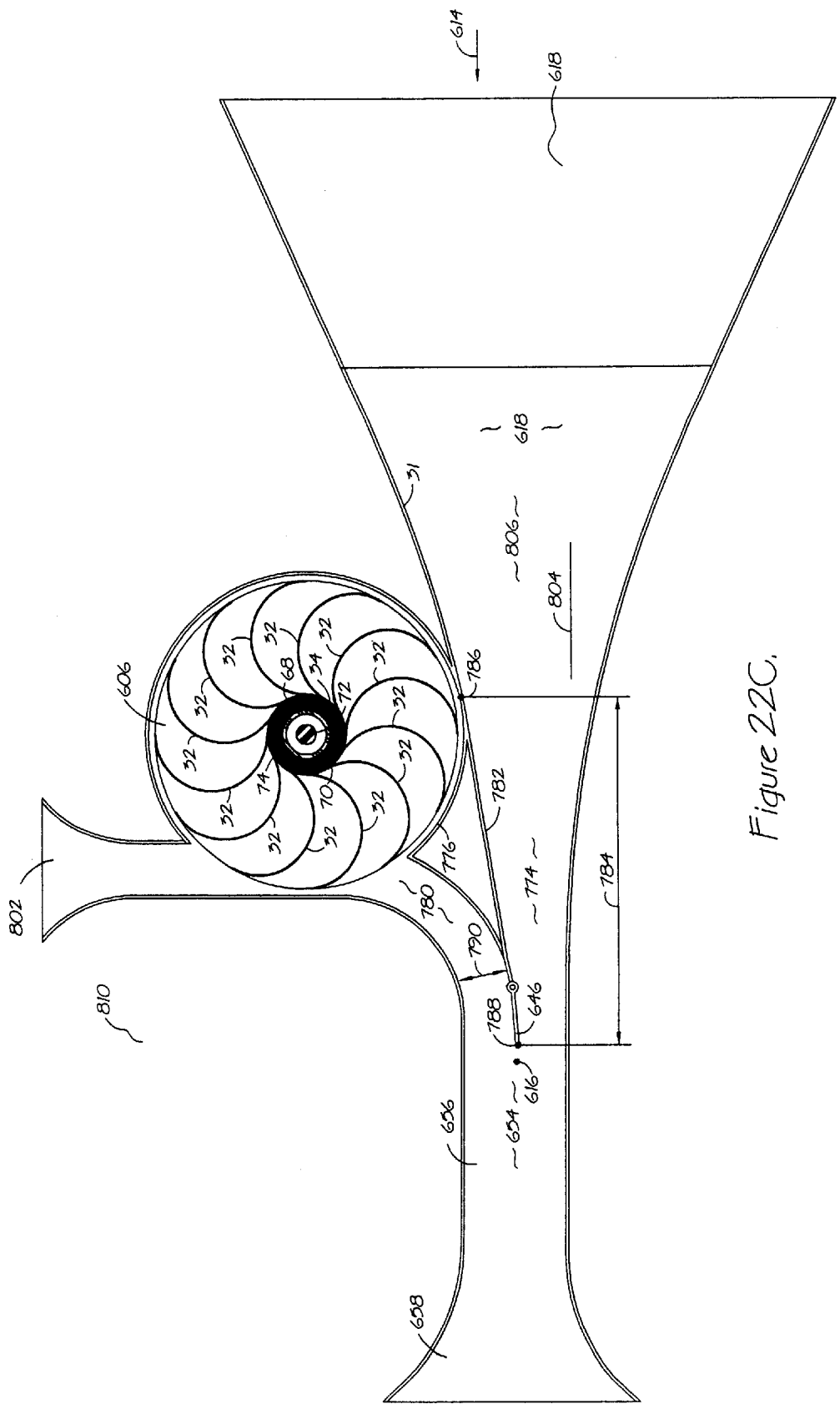
FIG. 22C is another sectional view of a vacuum generating device.

The generator 810 of FIG. 22C is similar to the generator 800 of FIG. 22B but differs therefrom in its placement and orientation of input 802.

Figure 23:
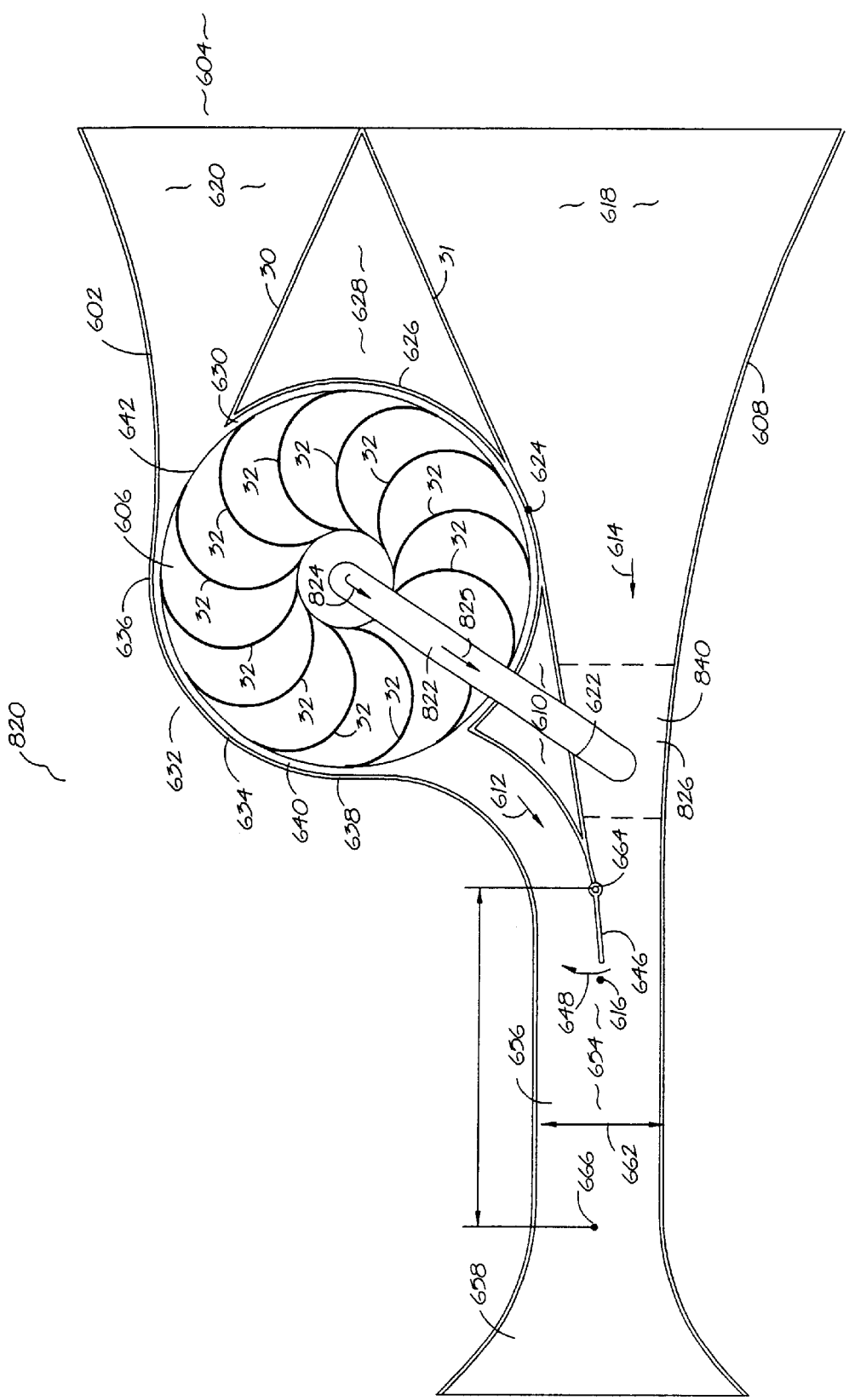
FIG. 23 is a sectional view of another preferred generator of this invention.

In the generator 820 illustrated in FIG. 23, air is caused to flow up from the plane of the paper in the direction of arrow 824 and thereafter flows in the direction of arrow 825 through the tube 822; and thereafter this air flows into the area 826 of the cowling. The air flow in the direction of arrow 824 is similar to the air flow that is depicted in FIG. 12. The assembly of FIG. 23 differs from the assembly of FIG. 12 in that the former assembly is comprised of a cowling 828 connected to a tube 822.

In the operation of the device 820, the incoming bypass air flow 614 tends to facilitate the flow of air through tube 822, thereby cooling the coils 70 (see FIG. 1).

Figure 24:
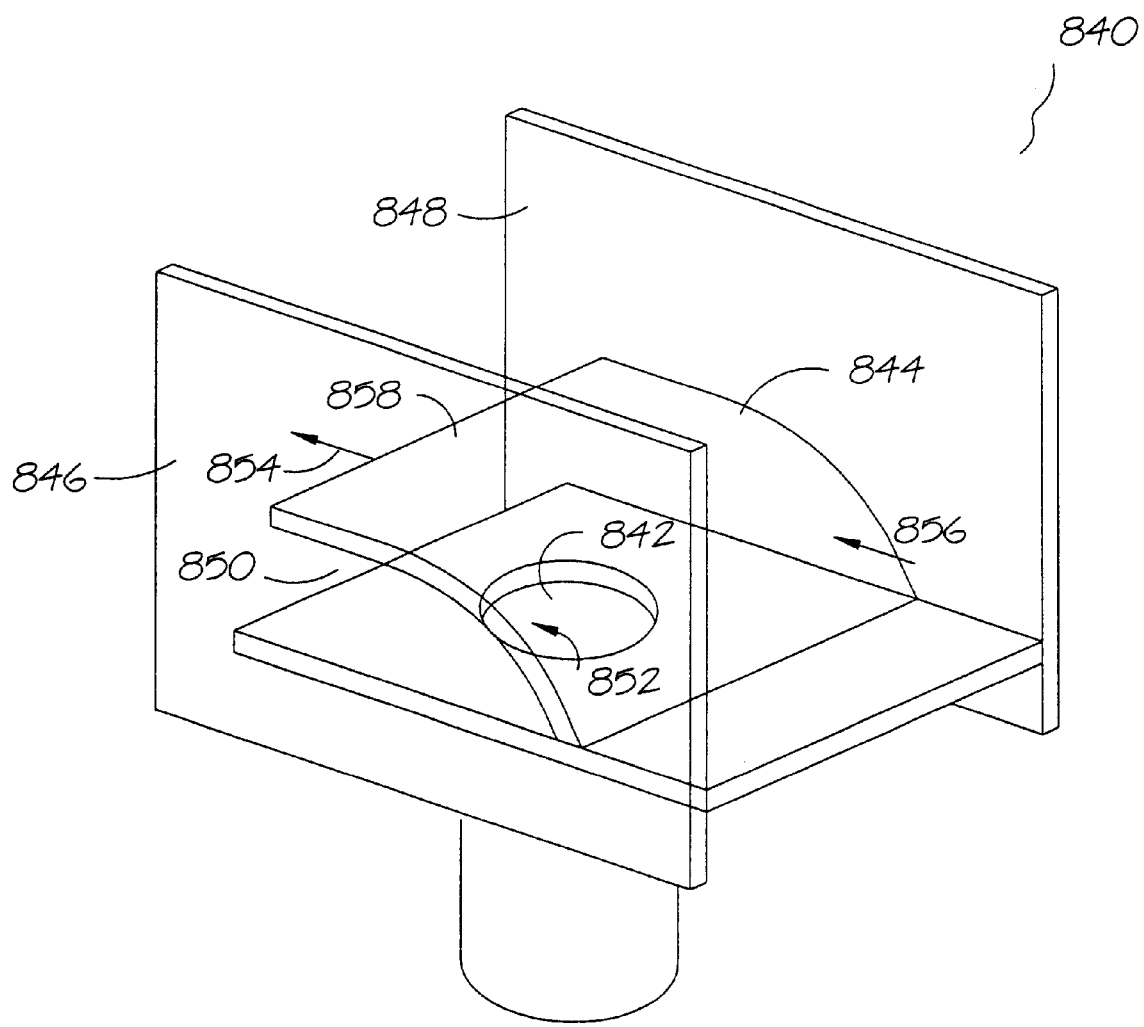
FIG. 24 is a perspective view of a portion of the generator depicted in FIG. 23.

FIG. 24 is a perspective view of a portion of the generator 820 depicted in FIG. 23. Referring to FIG. 24, it will be seen that vacuum generator 840 is comprised of an orifice 842 communicating with flap 844.

In the embodiment depicted in FIG. 24, the flap 844, in conjunction with sidewall 846 and sidewall 848, forms a substantially closed chamber 850. Air may flow in the direction of arrow 852 through orifice 842, and then against flap 844 and/or sidewall 846 and/or 848, and then in the direction of arrow 854. In addition, air flowing from outside the vacuum generator 840 in the direction of arrow 856 flows over the upper surface 858 of vacuum flap 844 and, in so doing, draws air from orifice 842 in the direction of arrow 854.

Figure 25:
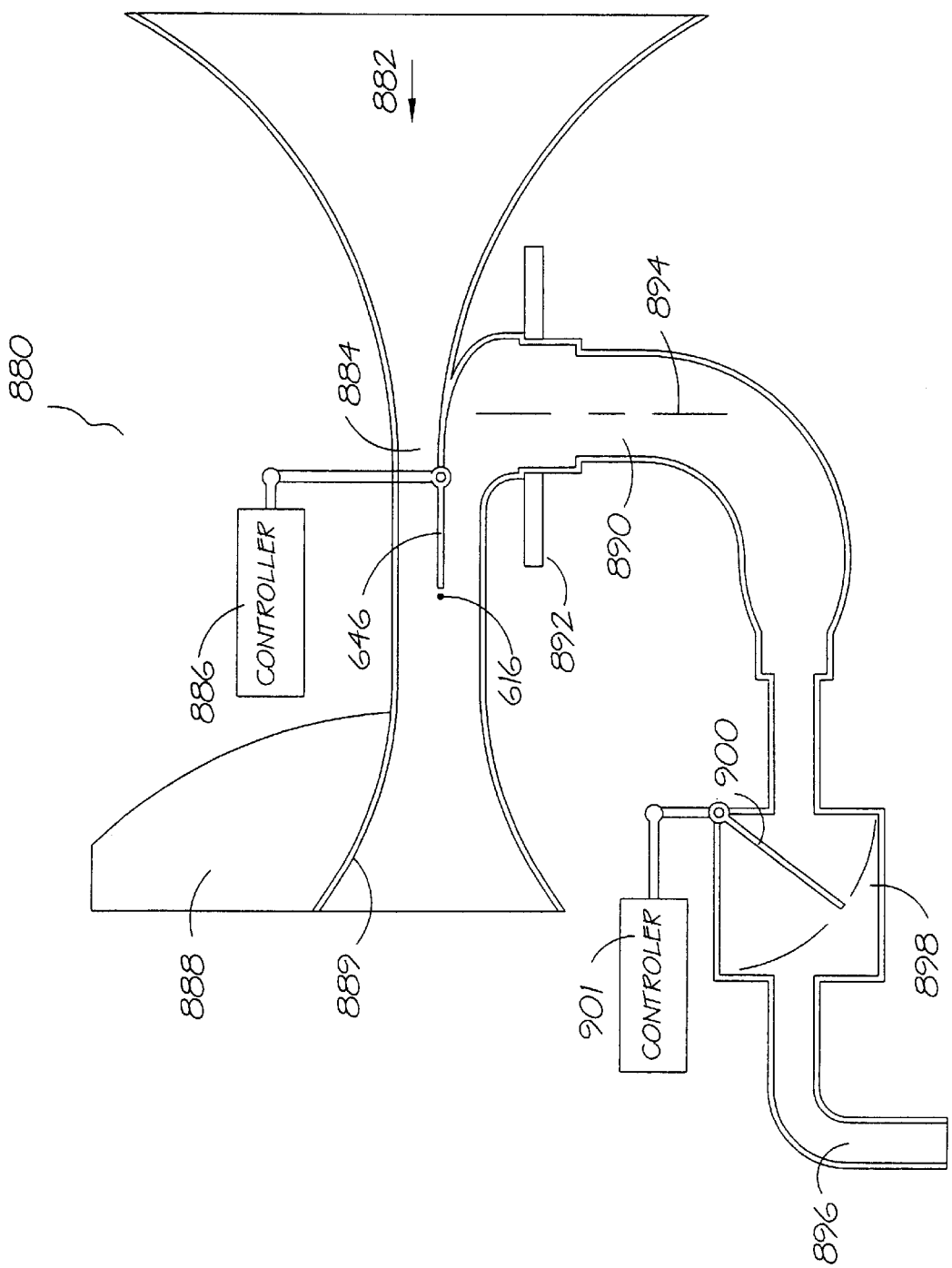
FIG. 25 is another sectional view of a vacuum generating device.

FIG. 25 is a sectional view of a vacuum generator 880. In the vacuum generator 880, input air preferably flows in the direction of arrow 882 over vacuum flap 646. The flap 646, in the embodiment depicted, is pivotally attached to sidewall 884. The flap 646 is operatively connected to a controller 886 that can vary the position of such flap. One may use any of the control means discussed elsewhere in this specification.

Referring again to FIG. 25, and in the preferred embodiment depicted therein, a tail fin 888 is fixedly mounted on wall 889. Vacuum tube 890 is pivotally mounted on support 892 and is adapted to rotate around its vertical axis 894 so that the generator 880 can orient itself to the wind direction (not shown).

In the operation of vacuum generator 880, as a vacuum is created at point 616, air is caused to flow into the device 880 through pipe 896 and damper 898. The extent to which such air flow is allowed will depend upon the position of damper flap 900, which position may be varied by actuator 901 and controller 902.

Figure 26:
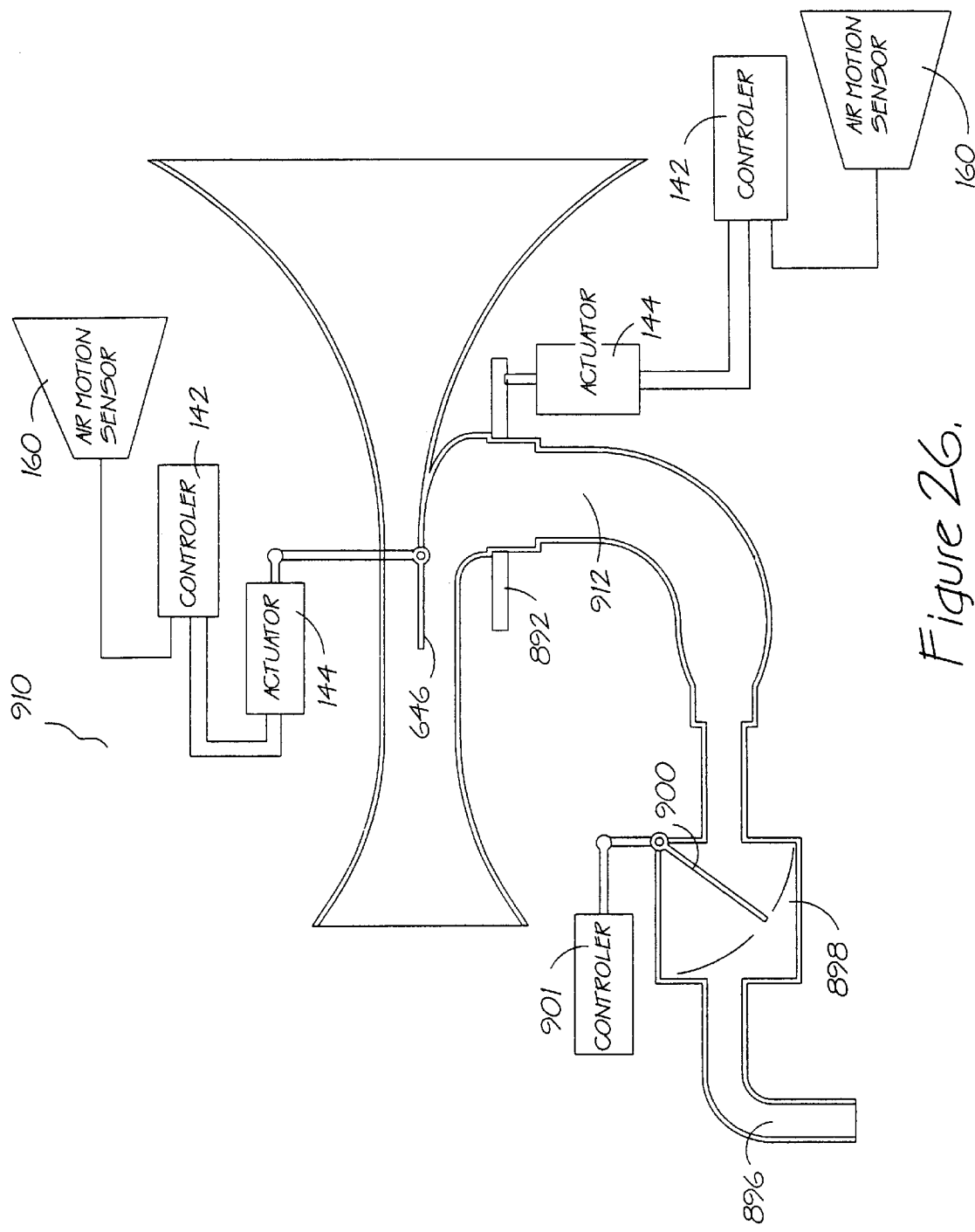
FIG. 26 is another sectional view of a vacuum generating device.

FIG. 26 is a sectional view of another vacuum generator 910. In the embodiment depicted, the position of flap 646 can be varied with the controller 142 in the manner described elsewhere in this speciation. Similarly, the position of support 892 also may be varied by the controller 142.

In one embodiment, support 892 is a turntable that movable in the X axis, the Y axis, and Y axis. In another embodiment, not shown, the tube 912 is pivotally mounted within the support 892. Other means of adjusting the position of generator 910 in the X axis, and/or the Y axis, and/or the Z axis, also may be used.

Figure 27:
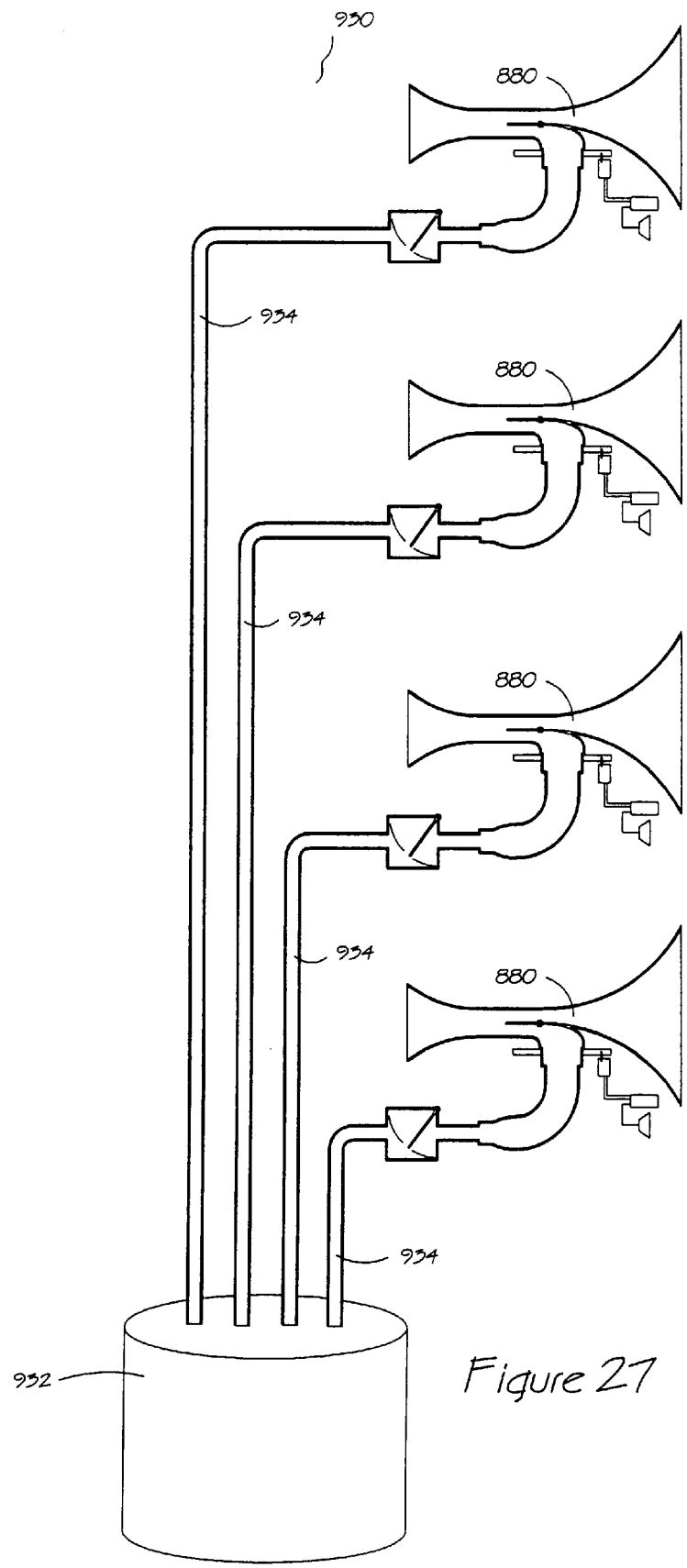
FIG. 27 is a sectional view of a multiplicity of vacuum generating devices connected in parallel.

FIG. 27 is a schematic representation of an assembly 930 comprised of a multiplicity of vacuum generators 880, each of which is connected to a manifold 932 by tube 934.

Figure 28:
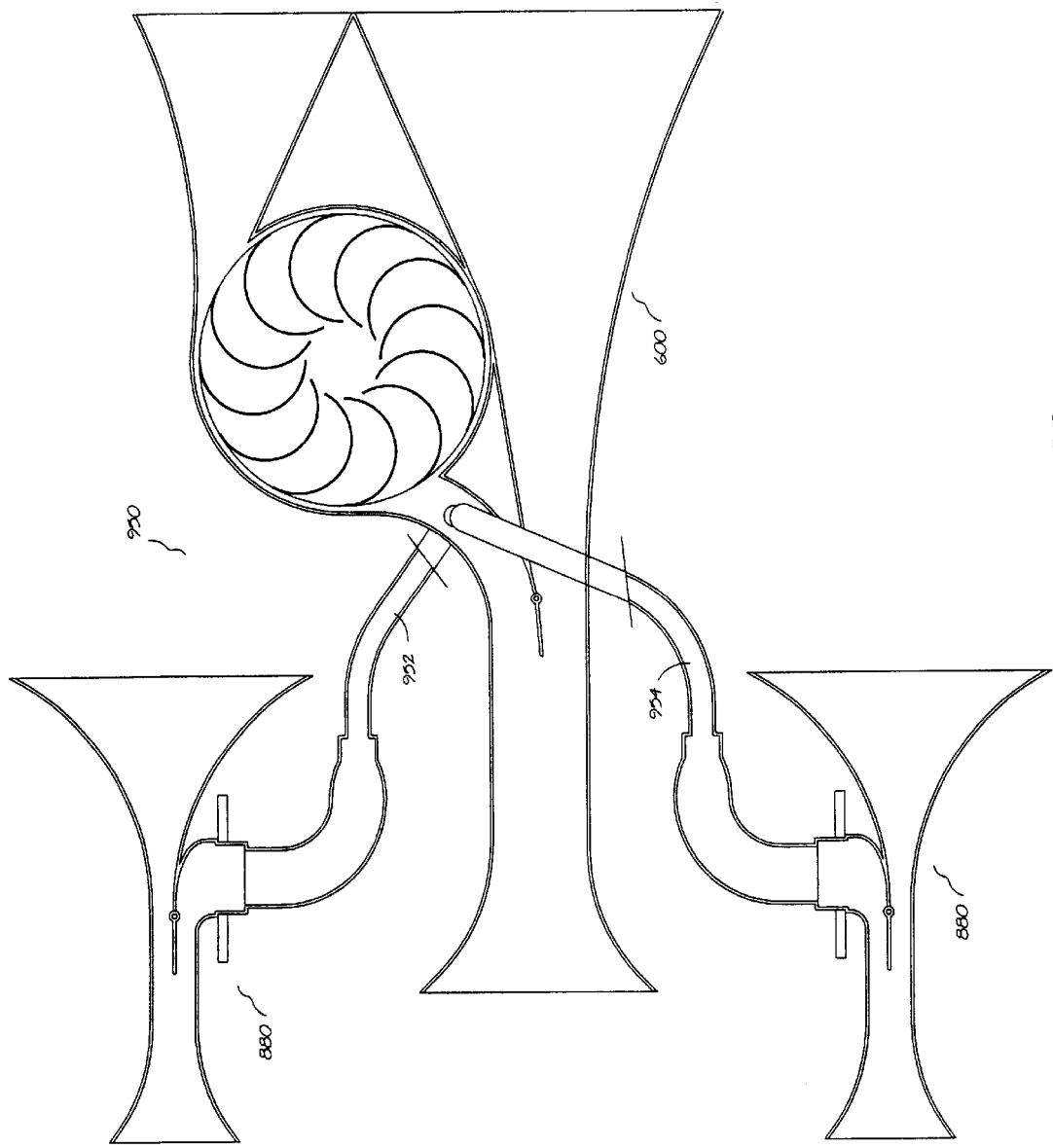
FIG. 28 is a sectional view of yet another preferred generating apparatus of this invention.

FIG. 28 is a schematic representation of a generator assembly 950 comprised of two vacuum generators 880 connected, respectively, by tubes 952 and 954 to electrical generator 600 and, in particular, to exhaust tube (see FIG. 1).

Figure 29:
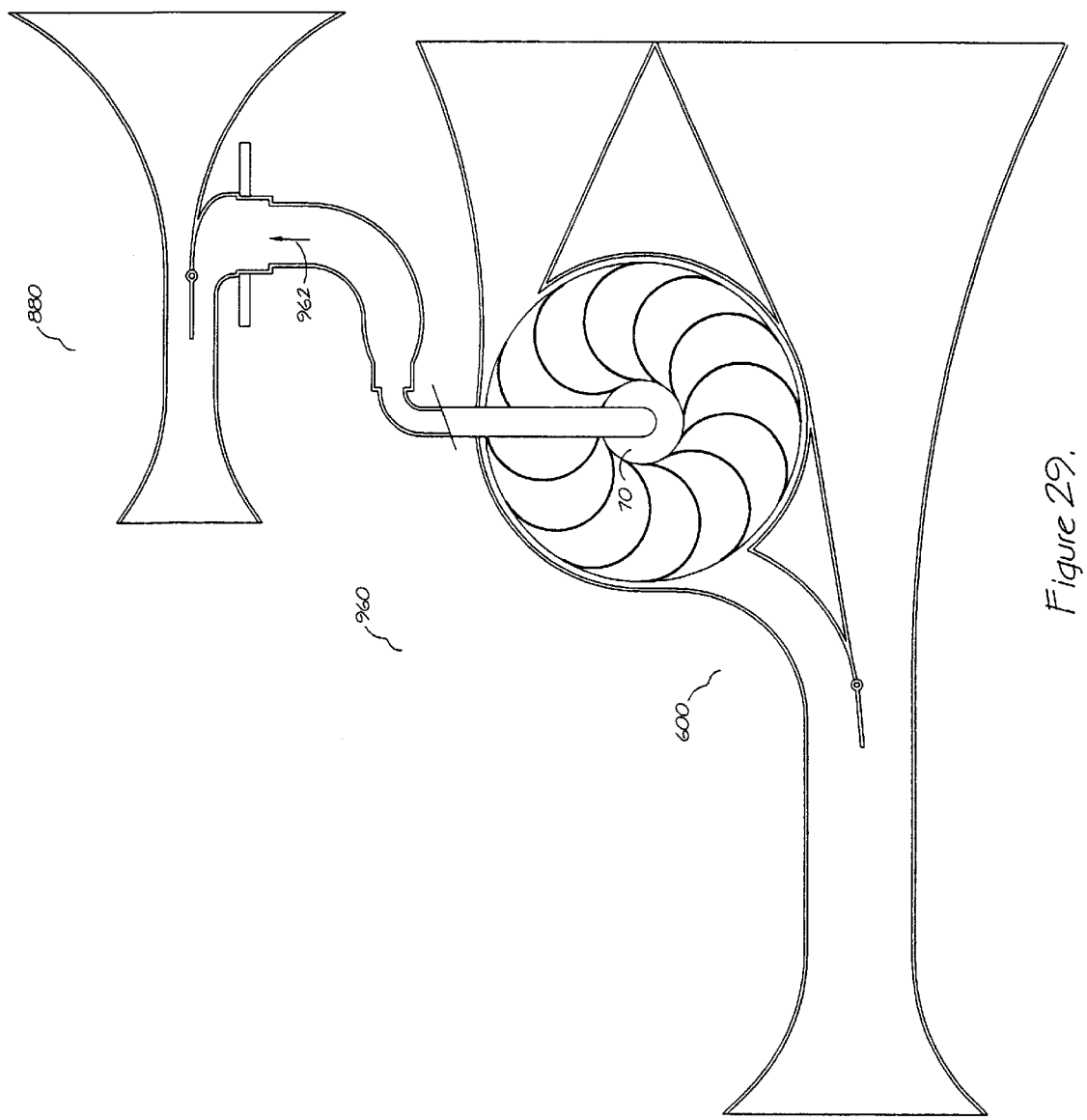
FIG. 29 is a sectional view of another preferred generating apparatus of this invention.

FIG. 29 is a schematic representation of a generator assembly 960 comprised of a electrical generator assembly 600 connected to a vacuum generator 880. In the embodiment depicted in FIG. 29, air will be caused to flow in the direction of arrow 962, thereby cooling the generator components, such as, e.g., coil 70 (see FIG. 1).

Figure 30:
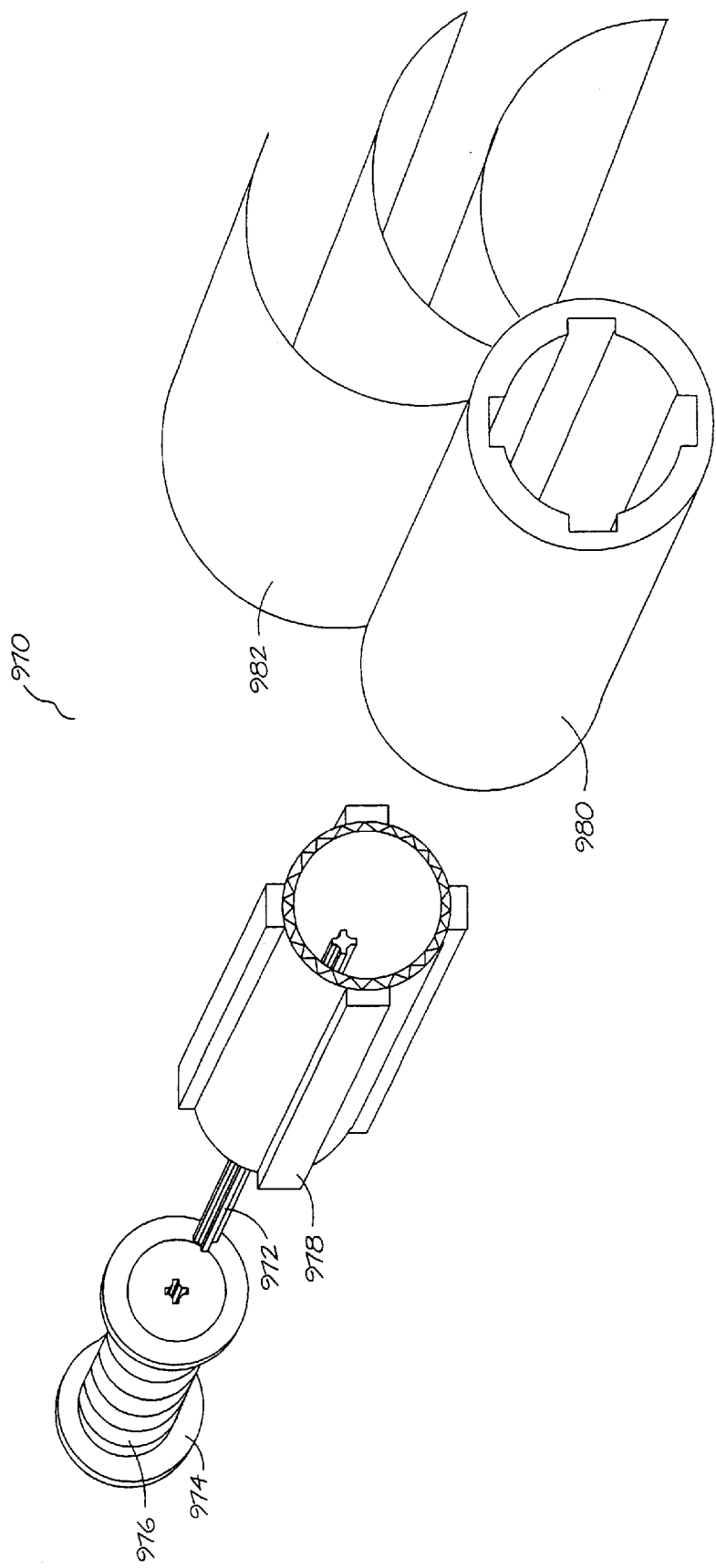
FIG. 30 is a perspective exploded view of another preferred generator of this invention.

FIG. 30 is an exploded view of a spool assembly 970 comprised of a splined shaft 972 removably connected to a spool 974. Disposed on spool 974 are a multiplicity of wound coils 976. The spool 974 and the shaft 972 are disposed within magnet assembly 978 which, in turn, is disposed within turbine impeller assembly 980. A multiplicity of blades 982 are disposed about the periphery of turbine impeller assembly 980, preferably tangentially.

As will be apparent, the spool 974 is keyed to removably fit within magnet assembly 978, which is keyed to removably fit within turbine impeller assembly 980.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A fluid-driven power generator comprised of a turbine comprised of a multiplicity of vanes, wherein said turbine is within a housing assembly, and wherein said housing assembly is comprised of an exhaust chamber, means for directing a first fluid towards said vanes of said turbine, means for directing a second fluid through said housing assembly without contacting said turbine, means for combining said first fluid and said second fluid in said exhaust chamber, and means for creating a vacuum in said exhaust chamber, wherein:

(a) said means for directing fluid towards said tangential portions of said turbine comprises a first interior sidewall, and a second interior sidewall connected to said first sidewall, and (b) said means for directing fluid towards said tangential portions of said turbine is comprised of means for causing said fluid to flow around said turbine and, for at least about 120 degrees of said flow of said fluid around said turbine, for constricting said fluid and increasing its pressure.

2. The power generator as recited in claim 1, wherein said means for creating a vacuum in said exhaust chamber is comprised of a movable vacuum flap disposed in said exhaust chamber.

3. The power generator as recited in claim 2, wherein said housing is comprised of an air flow diverter.

4. The power generator as recited in claim 3, wherein said vacuum flap is pivotally connected to said air flow diverter.

5. The power generator as recited in claim 4, wherein said exhaust chamber is comprised of a constant area section and a varying area section.

6. The power generator as recited in claim 5, wherein the cross-sectional area of said constant area section varies by no more than about 10 percent.

7. The power generator as recited in claim 2, further comprising means for moving said vacuum flap.

8. The power generator as recited in claim 7, wherein said means for moving said vacuum flap is comprised of a sail.

9. The power generator as recited in claim 7, wherein said means for moving said vacuum flap is comprised of a controller.

10. The power generator as recited in claim 9, wherein said means for moving said vacuum flap is comprised of an actuator.

11. The power generator as recited in claim 10, wherein said means for moving said vacuum flap is comprised of an air motion sensor.

12. The power generator as recited in claim 1, wherein said housing further comprises a funnel connected to the front of said housing.

13. The power generator as recited in claim 12, wherein said funnel is comprised of a first wall and a second wall disposed vis-à-vis each other at an angle of from about 30 to about 45 degrees.

14. The power generator as recited in claim 1, wherein said turbine is a counterrotating turbine.

15. The power generator as recited in claim 1, wherein said turbine is comprised of a turbine impeller assembly.

16. The power generator as recited in claim 1, wherein said power generator is comprised of means for varying the volume of air flowing out of said turbine impeller assembly.

17. The power generator as recited in claim 16, further comprising a first sail.

18. The power generator as recited in claim 17, further comprising a second sail.

19. The power generator as recited in claim 18, further comprising a first biasing means connected to said first sail and a second biasing means connected to said second sail.

20. The power generator as recited in claim 19, further comprising a first valve connected to said first biasing means and a second valve connected to said second biasing means.

* * * * *